United States Patent [19]

Jones et al.

[11] Patent Number: 4,663,704
[45] Date of Patent: May 5, 1987

[54] UNIVERSAL PROCESS CONTROL DEVICE AND METHOD FOR DEVELOPING A PROCESS CONTROL LOOP PROGRAM

[75] Inventors: Donald J. Jones, O'Hara Township, Allegheny County; Warren A. Edblad, Penn Hills; Judith S. Pringle, Saltsburg; David M. Oravetz, Aspinwall; Joann R. Patelunas, O'Hara Township, Allegheny County, all of Pa.

[73] Assignee: Westinghouse Electric Corp., Pittsburgh, Pa.

[21] Appl. No.: 677,442

[22] Filed: Dec. 3, 1984

[51] Int. Cl.⁴ .................. G05B 19/42; G05B 11/01
[52] U.S. Cl. .................................... 364/188; 364/138; 364/146; 364/147; 364/180; 364/191; 364/900
[58] Field of Search ............... 364/200, 900, 131, 138, 364/146, 147, 160, 180, 188, 189, 191-193

[56] References Cited

U.S. PATENT DOCUMENTS

| | | | |
|---|---|---|---|
| 3,971,000 | 7/1976 | Cromwell | 364/200 |
| 3,976,981 | 8/1976 | Bowden | 264/900 |
| 4,064,395 | 12/1977 | Schubeler et al. | 364/147 |
| 4,215,396 | 7/1980 | Henry et al. | 364/200 |
| 4,303,973 | 12/1981 | Williamson, Jr. et al. | 364/188 |
| 4,418,381 | 11/1983 | Molusis et al. | 364/131 |
| 4,424,559 | 1/1984 | Lorinez et al. | 364/172 |
| 4,443,861 | 4/1984 | Slater | 364/189 |
| 4,451,895 | 5/1984 | Sliwkowski | 364/188 |
| 4,455,619 | 6/1984 | Masui et al. | 364/147 |
| 4,488,258 | 12/1984 | Strager et al. | 364/900 |
| 4,490,781 | 12/1984 | Kishi et al. | 364/147 |
| 4,528,623 | 7/1985 | Tachibana | 364/189 |
| 4,542,452 | 9/1985 | Fukai et al. | 364/146 |
| 4,570,217 | 2/1986 | Allen et al. | 364/900 |

Primary Examiner—Jerry Smith
Assistant Examiner—John R. Lastova
Attorney, Agent, or Firm—W. E. Zitelli

[57] ABSTRACT

A distributed processing unit (DPU) or drop which performs process control and data acquisition functions in a distributed processing control system having a data highway linking a plurality of such units. A DPU functional processor accesses the local process I/O interface thereby continually receiving plant information for storage in digital form and subsequent use in the functional processor or for transmission along the data highway. DPU control programs use process values in a transparent fashion, that is without regard to whether these values were obtained through local process I/O interface or via the data highway. The DPU software structure is made up of execution software and support software. The execution software is a collection of data acquisition and process control programs which are developed at an engineer's console drop using a DPU programming language which operates in text and CRT graphic display modes, the latter programming modes allowing system documentation via hard copy graphic display printout. These programs are initiated, performed consecutively, and repeated at specified intervals. The support software initiates process loop execution. Control programs which have been presented to the DPU as representations of ladder diagrams for sequential control or process flow diagrams for continuous process control are executed in the DPU functional processor to achieve the required process control operation.

8 Claims, 20 Drawing Figures

UNIVERSAL PROCESS CONTROL DEVICE AND METHOD FOR DEVELOPING A PROCESS CONTROL LOOP PROGRAM

CROSS-REFERENCE TO RELATED APPLICATIONS

The present application is related to two groups of previously filed patent applications and one concurrently filed patent application, all assigned to the same assignee as the present application, the first group all filed by Houser et al. on June 29, 1983 (Ser. Nos. 508,951; 508,795; 508,771; 509,122, 508,769; 509,071; 509,251; and 508,770) and Sept. 13, 1983 (Ser. No. 531,821), the second group all filed by Bukowski et al. on Dec. 16, 1983 (Ser. Nos. 562,378; 562,507; and 562,508) and on July 30, 1984 (Ser. No. 635,387), and the concurrently filed application entitled "Universal Process Control Device and Method", the disclosures of which are incorporated herein by reference.

BACKGROUND OF THE INVENTION

The invention relates to distributed process control systems, more particularly to distributed process control systems which are integrated to perform sequential and continuous control and data acquisition.

Process control technology involves the application of control techniques to industrial processes to permit achievement of a desired level of performance and desired results. The historical development of process control technology reflects the evolution of a wide variety of control techniques to solve particular process control problems. However, the core issue in the solution of process control problems centers on the availability of tools with which to provide these solutions. The evolution of control techniques has in large part been based on the evolutionary development of control tools.

The industrial control business of the 1950's was divided into two different groups, the first being sequential control which used relays to provide motor control, and the second being continuous or modulating process control which used pneumatic devices to sense and control valves and pumps. Because the apparatus, i.e. motors, valves and pumps, for which the control tools were developed was manufactured by independent manufacturing industries, the control techniques evolved independently and there was no need for any integration.

With the solid state revolution came the ability to provide control tools based upon electronic circuits. The 1960's saw logic directors replace motor control relays, and also saw electronic analog devices replacing pneumatic modulating instruments. Even with control tools based on similar technology, sequential and continuous control systems remained independent along the lines of the supplier apparatus manufacturing industries. This period also saw the introduction of plant computers for data acquisition and monitoring, although not performing control functions.

At this stage, the goal of total process management appeared on the horizon. As plant computers grew in processing capability, it became evident that they could also absorb control responsibilities. Thus, the evolution of the direct digital control (DDC) computer system permitting integration of control and data acquisition functions, with the added capability of total process optimization and management. For a while, this seemed to be the ultimate solution for process control. However, application experience proved otherwise. A combination of factors was at work, notably the tendency to funnel all process control functions into a given piece of equipment, the plant computer. System response times became intolerable. Added to this was the difficulty of coordinating the motor control and instrumentation engineering design groups responsible for different portions of a given plant. Thirdly, this approach gave birth to the industry expression "the system is down" which meant that an entire plant control system was inoperable, often with disastrous results.

The middle 1970's brought about radical changes in the approach to sequential and continuous process control. The introduction of programmable controllers (PC's) allowed sequential control techniques to be programmed in the form of familiar relay ladder diagrams which were representative of the sequentially controlled process. These PC's also allowed continuous process control functions, traditionally analog in nature, to be performed in digital fashion. At this stage, process control was divided into essentially independent segments, each segment executing in a low cost microprocessor. Distribution of different control functions among many independent processing units eliminated the sluggishness and reliability problems of the DDC system. A serial process control data highway allowed an operator to communicate with the process via a color CRT screen. The data acquisition functions were kept in a separate minicomputer, and a data port allowed transfer of separately gathered process data onto the data highway.

This stage of evolution presented three essentially independent systems, a distributed system for sequential control, a distributed system for continuous process control, and a central computer system for data acquisition and optimization. Each had been designed independently, and none had been designed with the idea of integration in mind. When used for primarily one type of control, each of these systems was successful. It is important to note that at this stage of evolution, three different programming languages and programming techniques were required to implement these systems. This cumbersome programming problem was compounded by the lack of simple and meaningful user documentation for all three independent systems. This is the stage of development from which most process control systems in use today are derived.

However, the evolution in hardware as described above was accompanied by an evolution in the approach to solution of process control problems. Entering the ranks of the control design engineers were those trained to approach process control system problems so as to maximize process efficiency. Therefore, their ability to apply ladder diagrams for sequential control and process flow diagrams for continuous process control had to be matched by available hardware in which to implement these two techniques. Because of the independent hardware development in each of these areas, the control design engineer was thwarted in his attempt at integration. In addition, the desirability of including data acquisition capability further compounded the problem because of the tendency for a designated plant computer to burden the system response time in accessing information along the data highway. In order to advance to the next stage of distributed process control, there had to be a means to enable data highway communication that would eliminate the system sluggishness and allow integration of sequential and continuous process control functions along with data acquisition in a single control system. Just such a significant development was the subject matter of the applications outlined in the cross-reference at the beginning of the present application. There, a data highway communication system for a distributed process control system was disclosed in great detail, indicating the advantage of having a global data base available for distributed processors along a data highway. The global data base contains all of the information necessary to permit sequential and continuous process control while also handling data acquisition functions. However, that series of applications, while alluding to the capability of performing sequential and continuous control and data acquisition functions in a single system, provided only a general description of the distributed processing unit or drop connected to the data highway and the method of programming it to perform these functions.

The preceding discussion of the evolution of distributed processing control systems points to the desirability of a distributed processing control unit or drop in such a system which is connected to a data highway and which is capable of performing sequential and continuous process control and data acquisition functions all in the same unit. Such a universal process control device would enable a control design engineer to distribute the various process control tasks among several such drops while integrating in each of them the capability for performing a combination of control techniques. It would also be desirable if such a distributed processing control unit were easily programmed through a single programming language and technique. It would also be desirable if such a programming technique provided the user with simplified documentation of the control system configuration.

SUMMARY OF THE INVENTION

The present invention provides a distributed processing unit (DPU) or drop which performs process control and data acquisition functions in a distributed processing control system having a data highway linking a plurality of such units. Each single DPU drop is capable of performing all of these operations, and is actually an independent subsystem used to interface plant process and control signals to other drops on the data highway. This subsystem includes support for system-wide communications as well as functional processing capabilities and local process I/O hardware interface. A DPU functional processor accesses the local process I/O interface thereby continually receiving plant information for storage in digital form and subsequent use in the functional processor or for transmission along the data highway. The plant information accessed by the functional processor is converted into engineering units and is limit-checked to detect abnormalities in the system. Control programs are executed sequentially in the functional processor without interrupts to ensure security of control and data acquisition functions. The control programs use process values in a transparent fashion, that is without regard to whether these values were obtained through local process I/O interface or via the data highway. A data highway controller allows for this by obtaining all process values not local to the DPU by listening on the data highway for these values needed by the functional processor and storing them in shared memory. The present invention provides, in one drop, both control and data acquisition functions. This eliminates the duplication of plant sensor instrumentation, and allows for an integrated approach to sequential and continuous process control as well as data acquisition. The DPU software structure is made up of execution software and support software. The execution software is a collection of data acquisition and process control programs which are developed at an engineer's console drop using a DPU programming language which operates in text and CRT graphic display modes, the latter programming modes allowing system documentation via hard copy graphic display printout. These programs are initiated, performed consecutively, and repeated at specified intervals. The support software initiates process loop execution. It also ensures error-free interaction between the hardware and the execution software by monitoring timing, making calls to subroutines and algorithmic procedures, and running diagnostic testing. Control programs which have been presented to the DPU as representations of ladder diagrams for sequential control or process flow diagrams for continuous process control are executed in the DPU functional processor to achieve the required process control operation.

BRIEF DESCRIPTION OF THE DRAWINGS

The invention will be better understood by reference to the accompanying drawings, in which.

DESCRIPTION OF THE PREFERRED EMBODIMENT

1. System Outline

Figure 1:
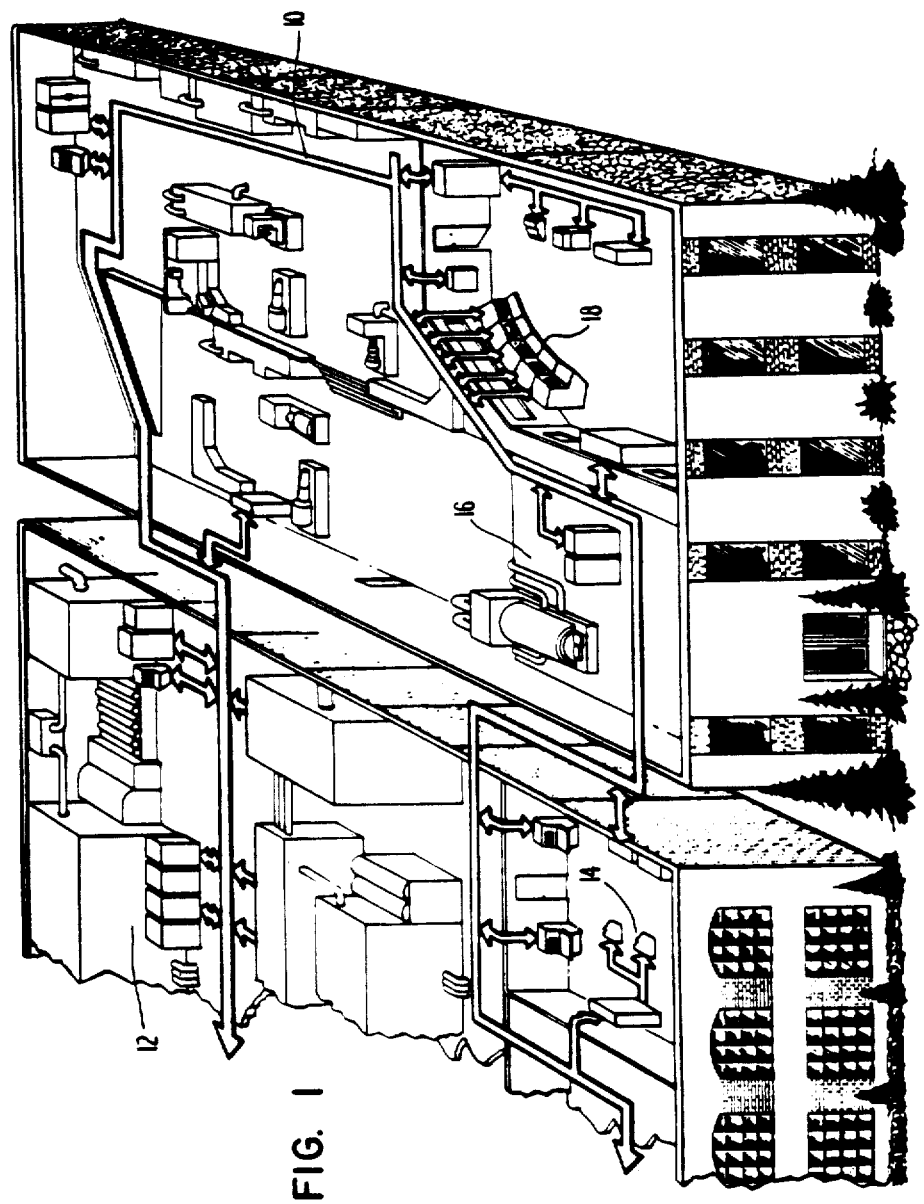
FIG. 1 shows an idealized perspective, cut-away view of a plant employing the distributed processing system according to the invention.

A primary object of the invention is to provide a distributed process control system in which a single data highway connects all the various input/output terminals, data acquisition stations, control devices, record keeping devices, error and alarm indicators, and means for communication with other data processing systems. FIG. 1 shows an overview of the system of this kind according to the invention. A single data highway 10 connects a wide variety of input/output devices such as process control devices 12, input/out terminals 14, sensors 16, control display devices 18 and the like. According to the invention and as will be further detailed below, the various inputs and outputs to the data highway 10 are termed "drops"; all interact with the data highway in substantially an identical way, although, of course, not all of them utilize the same properties of the data highway. This allows the system to be considered modular because any number of any type of drops may be added to the system. In a preferred embodiment up to 254 different drops can be used. They all have access to the entire data base of the system, which is copied or stored in the respective memories of each drop, and all can communicate with one another where required. This is done to ensure maximum flexibility and also to avoid use of a single central computer. As discussed above, this is desirable for a variety of reasons, one of which is that the system can keep operating even if one or more of the drops is disabled, whereas if a central computer were disabled, the entire system would effectively be shut down. The fact that the drops all communicate with each other allows different portions of the system to provide inputs and outputs to various control loops and the like. The mixed-mode operation of the highway discussed below, allows such traditional central computer functions as program download, status report generation and the like to be performed by drops configured as operator terminals, and without interruption of the system functions. Complete "data transparency" is achieved, that is, each processor can "see into" the memories of the other drops, eliminating the requirement of central memory, and providing very fast cathode ray tube displays which may be customized according to the operator's desires, allowing flexibility in the choice of programming languages.

Figure 2:
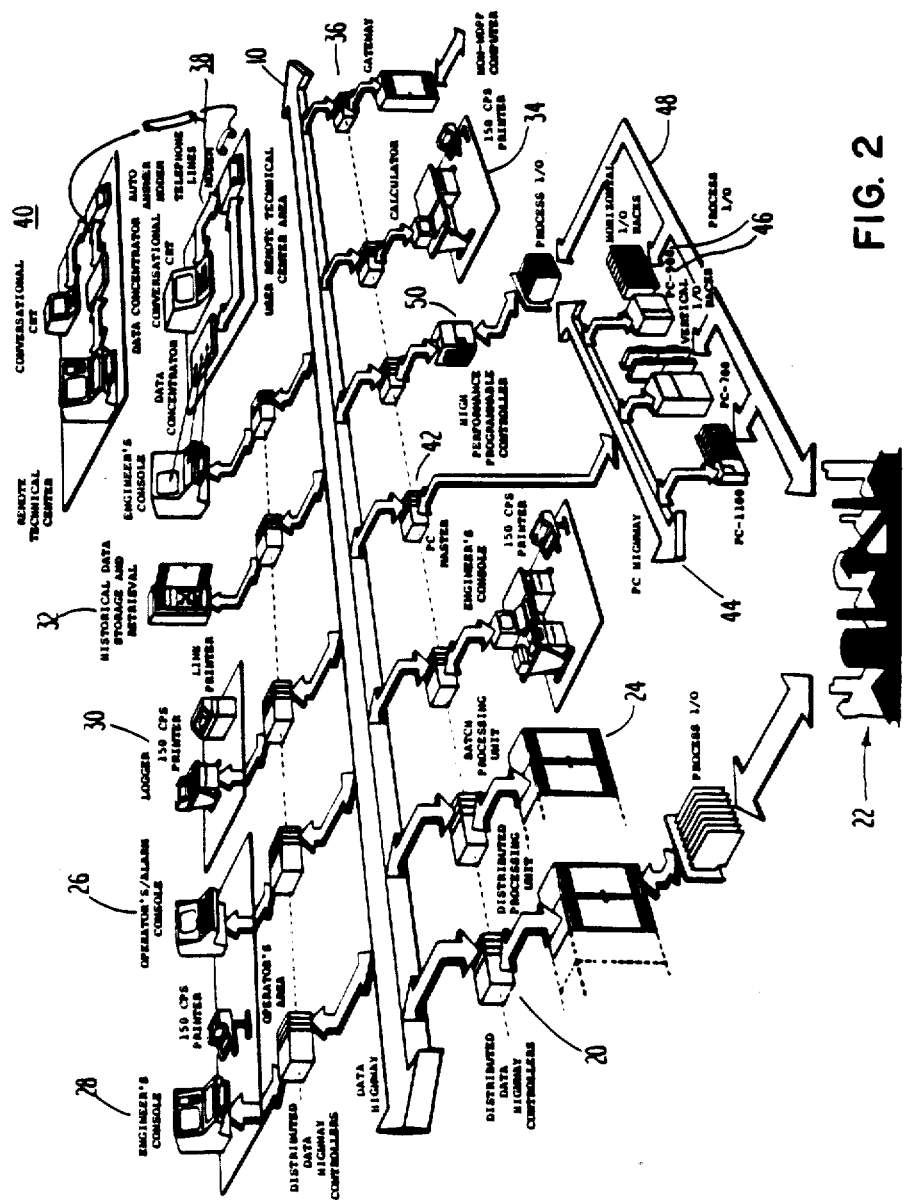
FIG. 2 shows a similar view of the processing system according to the invention in more detail.

FIG. 2 shows a more detailed view of a portion of a distributed processing system according to the invention. A data highway 10 connects a plurality of drops which are arranged to perform varying functions. Each drop comprises a processor for performing such functions; as used herein the term processor refers to the hardware and software at the drop location, which is connected by suitable means to the highway. Processors may include, for example, a distributed processing unit 20 which performs a data acquisition and control functions and interfaces to the various industrial processes in the plant under control, indicated generally at 22. A batch processing unit 24 may also be used. The operator's alarm console 26 provides a cathode ray tube based control display and alarm console for a human operator. An engineer's console 28 can be used to provide functions provided by the operator's alarm console and also for programming of the system as desired. A data logger 30 may also be provided to record information generated during a production run. Historical storage and retrieval at 32 can be used to archive this data. One of the drops may also include a calculator function at 34 to provide special calculations required to optimize the plant operations, for example. One drop may be a "gateway" 36, providing interface to some other computer, and another interface unit may be provided at 38 for interface via a telephone line to a remote location as indicated at 40. A programmable controller master 42 is also shown as one of the drops. This provides the interface to a programmable controller highway 44 which is another bus to which a number of varying types of programmable controllers 46 may be connected. These, in turn, may connect by way of a process input/output bus 48 to other programmable controller devices as at 50. In this way, a large number of differing controllers of varying types can all be interfaced to one drop to save access spots on the data highway 10, and to allow complete flexibility in drop design; each drop may be configured to suit its purpose, not merely to suit the overall system design.

Figure 3:
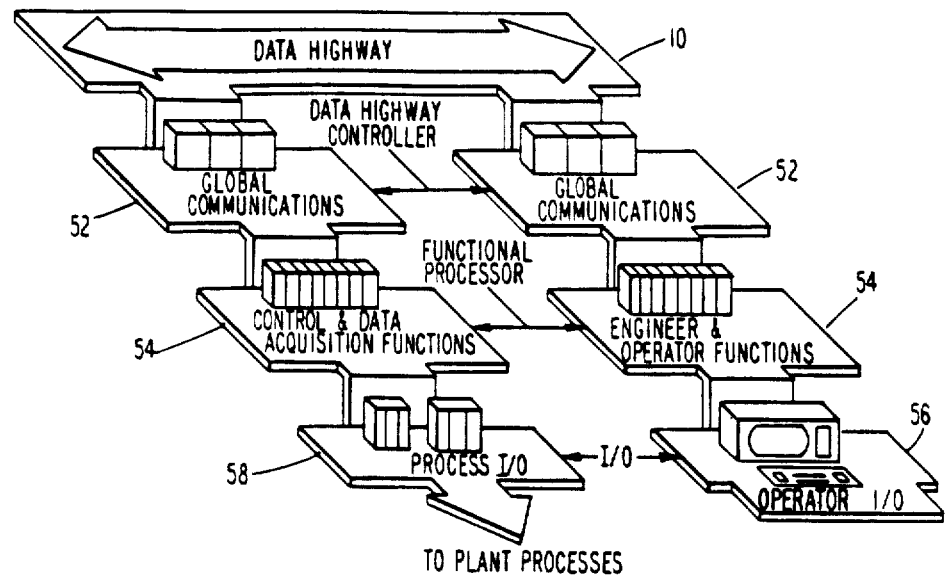
FIG. 3 shows building blocks used in manufacture of the system of the invention.

FIG. 3 shows in further detail the three sets of hardware which comprise the "building blocks" of the system according to the invention. To the data highway 10 are connected data highway controller (DHC) subsystems at 52. These are common to all drops and consist of a shared memory, a modulator/demodulator (Modem) for serial-to-parallel and parallel-to-serial data conversions and a data base highway processor which, in the preferred embodiment is a custom bit-slice microprocessor. The shared memory is dual ported and forms the interface between the data highway processor and the functional processor 54 (discussed below). The functional processor performs the specified tasks associated with the particular drop. The functional processor comprises a commercially available microprocessor, having one or more chips. As used herein, the term microprocessor may refer to a single chip or interconnected chips, as well as associated memory, and thus embraces microprocessor systems as known in the art.

The functional processor 54 has transparent communication through the DHC to the remainder of the distributed processing system according to the invention. All data transferred to and from shared memory appears to the functional processor as part of its internal data base, independent of origin. In the preferred embodiment, where data is supplied over the data highway to other drops, the data highway controller looks at each data message and compares it to a stored table to determine whether its associated functional processor will have use for this data. If so, the message is stored, or copied, into the drop's shared memory. The functional processor, therefore, is freed from such communications tasks and can concentrate on its own control tasks, using as memory the memory it shares with the data highway processor. The use of two processors with a shared memory greatly simplifies the data highway interface while providing additional local processing capability for the functional processor.

The functional processors 54 perform the specific functions associated with the drop, which may include such things as man/machine interface by means of an operator input/output terminal 56, as well as all forms of data acquisition and control processing, by means of process input/output devices 58. The functional processor obtains amd stores data from the shared memory, and its communication with other hardware as required, including mass memory process input/output and peripherals, is carried out by way of the data highway processor, thus freeing the functional processor from communications tasks.

The input/output interface 58 provides communication to the various processes in the plant controlled. According to this arrangement a wide variety of input /output devices are available, such as the operator console displays at 56, as well as all forms of process controller devices.

2. Communications Format

The communication format used according to the invention will now be described briefly in order to enable understanding of subsequent subject matter. Communication over the data highway bus is controlled by means of the data highway controllers at each drop. Communication is performed both by periodic broadcasts of process data and in response to requests made by any one of the drops. In the preferred embodiment, the system operates according to a mixed mode communications arrangement comprising repetitive and non-repetitive transmission modes. In a first repetitive portion of each hundred millisecond communications cycle, the system is operated according to a time division multiplexing (TDM) scheme during which each drop has at least one "slot" in time into which it injects a message onto the data highway. All the other drops can select data from the messages as desired. In the latter or non-repetitive half of each 100 ms interval, the "democratic" mode, the highway is available for other messages, such as requests for specific data from other drops and the like. Specifically, every 100 milliseconds, each drop (of which up to 254 may be provided in the preferred embodiment) has access to the highway allowing it to broadcast process values stored in its shared memory along with appropriate message identifiers and status information. Each non-broadcasting drop listens to broadcasts made by other drops, selects points of interest to it and pulls them off the highway to store them in its shared memory.

At the conclusion of each periodic broadcast cycle, the remaining time in each 100 millisecond time slice is available on a demand basis for other communications such as downloading of programs, transfer of English description of points, etc. The drops also send and respond to specific data requests from other drops where required.

In practice, all the process variables are broadcast at least once per second, but since each drop has access to the highway every 100 milliseconds, a drop can broadcast and update data concerning key process points as frequently as every 100 milliseconds if conditions warrant. The data highway has a transfer rate of two megabaud which provides a system broadcast rate of at least 10,000 process points per second. The broadcast technique used in the practice of this invention eliminates both the need for a master or traffic director and the high overhead associated with conventional send/acknowledge schemes in which an acknowledgement is passed back to the originating point in the system. According to the present system, the drops are not provided with acknowledgement that their messages have been received. Instead, the information is simply put on the highway to be taken by other drops as they require. Each drop is master of the highway for a moment and in its transmission includes a token, used to indicate the next drop to have highway access.

When the data base for a drop is created, data base information such as English descriptions of data points, alarm limits, etc., are defined and stored in the memory of the same drop where the process value is obtained or calculated. The system data base is thus distributed in many drops, as is the processing system; however the mixed mode broadcast means of communication allows any drop on the highway access to any process data residing anywhere in the system, as if it were part of its local data base. The data highway in essence thus acts as a distributed global data base available to any drop on the system, and the speed and architecture of the communications system ensures that this global data base is always current, never more than one second old.

This transparent access of each drop to the distributed global data base means that control loops can run in one drop using process values generated or calculated by other drops. In addition, transparent access to the global data base permits functions which would normally be constrained to run in one processor to be distributed anywhere on the highway, a feature which is greatly convenient in systems of large physical extent or complexity and also permits additional drops to be added to an existing system if increase in system performance is required without modification of the existing system or degradation of its performance. For example, more calculators, more historical storage, and more data acquisition drops can be added. Drops can be added without affecting the operation of the pre-existing drops, if desired, since each functional processor can be programmed to accept or ignore the broadcasts from the additional drops. In a like manner, drops can be removed without perturbing operation of the remaining drops.

Certain key functions of any processing system such as overall plant optimization, historical storage and retrieval and plant-wide logging require access to the entire data base. Traditionally, such functions have been performed through the use of a central host computer which periodically obtains plant data from the highway and then creates a data base within itself for use by these systemwide programs. The major deficiency of this approach has been the data bottleneck created at this one point and the potential saturation of the host computer since it has to provide many functions simultaneously. For example, traditional operator terminals have required access to the entire system data base, and have accordingly been configured as peripherals attached to host computers, which have access to a main memory in which is stored the entire data base. According to the present invention, the ability of any drop to access the total global data base transparently allows functions which would previously have required a host computer to be distributed among many drops and permits the host function to be carried out, in effect, by a distributed computer system. One drop can be arranged to provide historical storage and retrieval, another can be a calculator to provide plant optimization, and a third a logger drop to provide other functions which would previously have required a host computer. Higher system availability and elimination of performance degradation associated with host computers are obvious benefits. On the other hand, if for hierarchical or other interface considerations, a host computer should be required, one can easily be accommodated via a "gate-way" drop. Finally, the transparency of communications provided according to the invention allows additional drops to be connected to the system with ease.

In the preferred embodiment up to 254 drops can be connected to the coaxial cable forming the data highway, which can be up to 6 km in length without repeaters. In another envisioned embodiment, a fiber optic highway is used which has the capability of supporting up to 64 drops. As is well understood in the art, fiber optic cables have substantially better noise immunity than ordinary coaxial cables and this may be of significance in certain plant applications. While present system capacities are set by practical noise and time delay factors, the system and method of this invention are limited only by state-of-the-art engineering constraints. Further, by integrating data acquisition and local control functions in a single drop, duplication of sensors so often needed by systems which perform only one or the other function is avoided. The dual drop functions also permit easy integration of systems, for example, which start with data acquisition only and add control later. Moreover, this arrangement permits an integrated approach to process modulation and sequential control as well as to data acquisition.

3. Drop Overview

Figure 4:
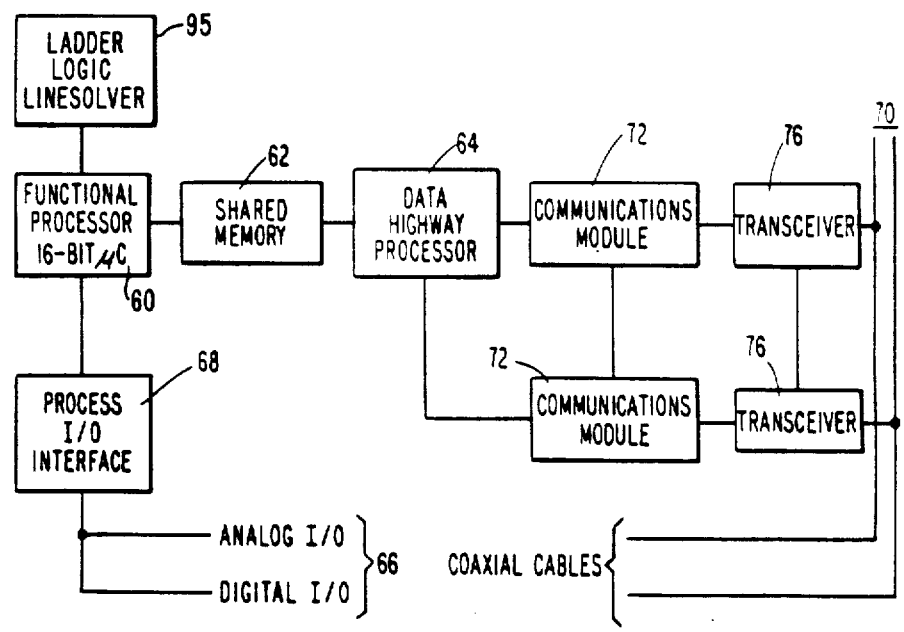
FIG. 4 shows a schematic view of the components making up a typical drop.

Referring now to FIG. 4, the system according to the invention uses a first functional processor 60 and ladder logic linesolver combination at the drop level for such functions as process monitoring, sequential and continuous process control and operator interface, while a second data highway processor 64 is used to obtain data from the highway as required by the functional processor and make its communications to the highway. In this way, the functional processor is free to concentrate on its data acquisition and control tasks and is relieved from the complex requirements of communications interface. The functional processor 60 is connected by means of a shared memory 62 to the data highway processor 64. Use of this shared memory 62 is very desirable in that it automatically provides the interface between the two processors without requirement of simultaneous transfer of data directly from one processor to the other. Instead, one or the other processors simply accesses the shared memory 62 as required. The functional processor 60 then is connected to various conventional input/output units 66 by a process input/output unit 68. As will be discussed in further detail below, the functional processor is connected to a conventional industry standard bus so that any form of presently available input/output equipment which is adapted to be connected to that bus can be used. In this way, the user of a system according to the invention is not constrained to use of any one manufacturer's process input/output units but can connect substantially any device desired.

The data highway processor 64 makes connection to the data highway 70 (corresponding to the highway 10 of FIGS. 1-3) which is shown duplicated for redundancy. The dual highways thus constitute physically separate transmission lines, or paths. As used herein, the term highway means a coaxial cable, optical fiber cable, or the equivalent. Further redundancy is provided by means of duplicated communication modules 72 and transceivers 76. These will be discussed in detail below. In particular the transceivers 76 form the subject matter of previously filed application Ser. No. 508,770 filed June 29, 1983, incorporated herein by reference. The data highway processor 64, the communications module 72, and the shared memory 62 correspond to the data highway controller 52 of FIG. 3.

Figure 5:
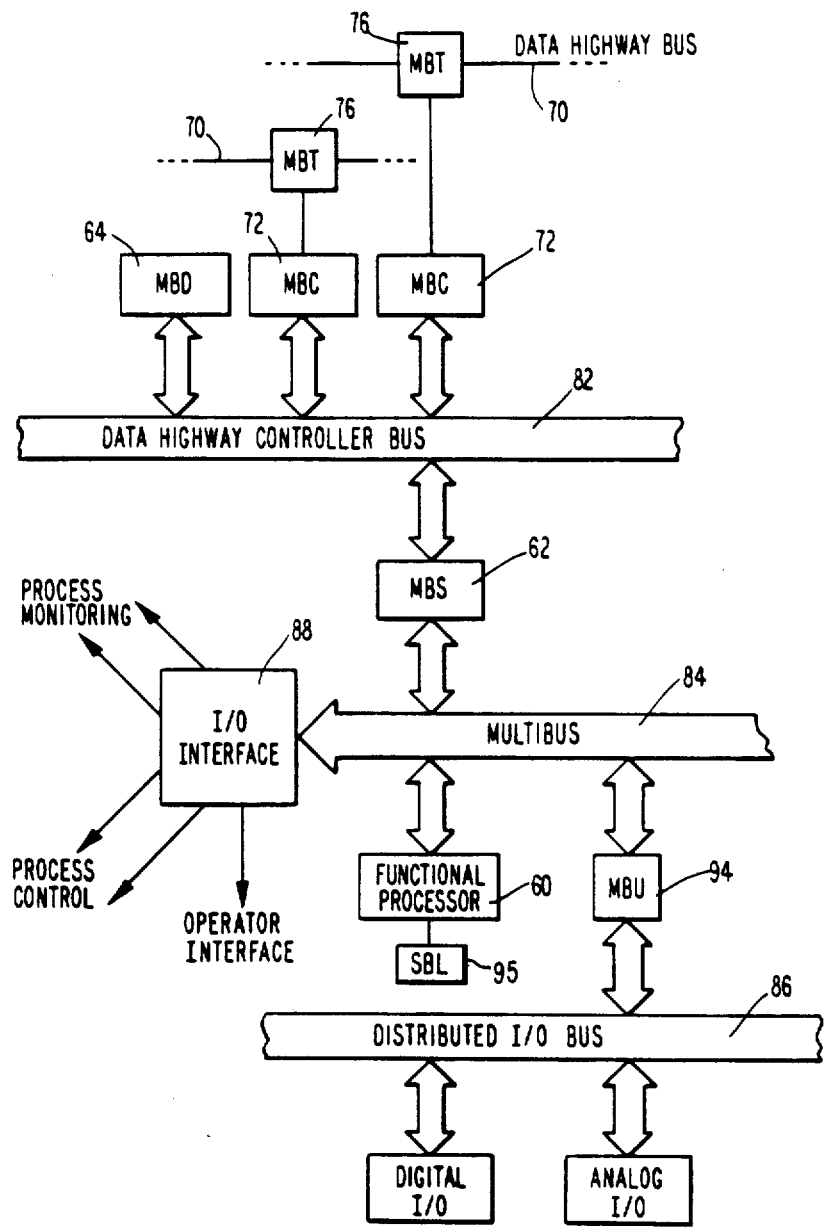
FIG. 5 shows a more detailed view of a typical drop showing use of redundant additional highway components.

FIG. 5 shows schematically further details how a data highway drop is arranged, and shows redundancy of certain components which in some environments may be desirable. The data highways 70 as shown are redundant. They are connected by means of transceivers (MBT) 76 to data highway communications controllers (MBC) 72 which are connected to a data highway controller (DHC) bus 82. The data highway communications cards (MBC) 72 are thus provided in redundant fashion. To the data highway controller bus 82 is connected the data highway processor (MBD) 64 which as discussed above performs the functions of communications between the functional processor 60 and the data highway 70. The data highway controller bus 82 makes its connection to the functional processor via the shared memory (MBS) 62 which is connected to the functional processor 60 by way of a second bus 84. In the preferred embodiment this second bus 84 conforms to the industry standard "Multibus" (trademark Intel Corporation). This industry-standard bus (defined in IEEE Standard No. 796) was adopted so that a user's choice of functional processor would not be limited to goods available from any one manufacturer, and so that users could select from the very wide variety of peripheral devices now available which interface to the industry standard Multibus data communications interface. This provides a great deal of flexibility in designing of drops. Effectively, the drop can be designed in accordance with the user's needs and system devices. At the present time there are literally thousands of peripherals available which are amenable to the Multibus interface, and the possible permutations of the system according to the invention are thus practically endless. A particularly versatile 16 bit microcomputer available from Intel Corp. under Model No. SBC 86/05 can be modified by the addition of hardware as described herein to provide sequential control capability based on programs which use a ladder diagram representation of the portion of the process suited for this control technique. This combined hardware forms a functional processor 60 which can readily be programmed as described herein to perform a wide variety of other useful functions, including man/machine interface, which includes video display generation, as well as process interface and sequential and continuous process control. See Intel Manual Order No. 143153-001.

An interface unit (MBU) 94 may be used to interface the Multibus 84 to a third bus 86, referred to as a distributed input/output bus. Connection can be made from bus 86 to input/output devices which may have different interface specifications. The functional processor 60 is also connected by way of Multibus 84 to input/output devices 88, as required for the various functions indicated, including process monitoring, process control and operator interface. Other drop functions are possible such as archival storage and the like.

Figure 6:
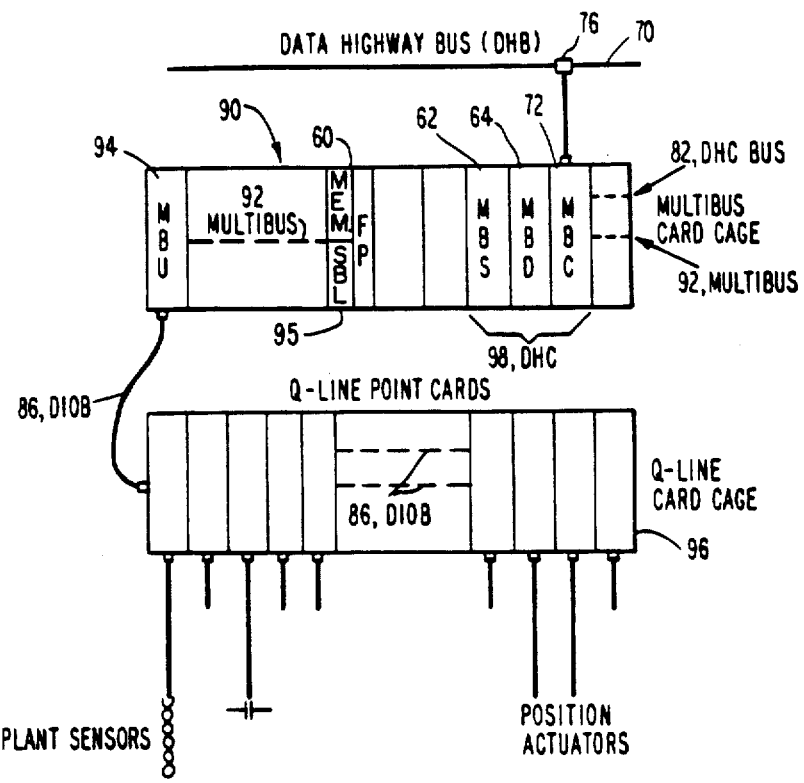
FIG. 6 shows the physical layout of a typical drop.

FIG. 6 shows the physical location in a drop of the components discussed above with respect to FIG. 5. The data highway 70 is connected to the transceiver 76, and a cable runs from it to the data highway communications (MBC) card 72 which is inserted in a Multibus card cage indicated generally at 90. The transceiver 76 may alternatively be carried in cage 90 where it is convenient to juxtapose this closely to the highway 70. Also carried in this cage and plugged into the Multibus are the components which are Multibus compatible, such as the shared memory system (MBS) 62, the functional processor 60, and the ladder logic single-board linesolver (SBL) 95. The Multibus connectors are shown as dotted lines 92 running across the back of the card cage. Thus, simply by inserting the cards into the cage, connection is automatically made to the Multibus. The data highway controller (DHC) bus 82 is also shown as a dotted line connecting the data highway processor 64, the shared memory (MBS) 62 and the data highway communications card MBC 72. The DHC bus is defined in the Appendix which forms a part of the specification in the first group of previously filed applications referred to in the Cross-Reference.

The Multibus 92 is connected to the functional processors indicated at 60 and also to the MBU unit 94 which provides connection by way of a distributed input/output bus 86 to a second card cage referred to as the Q-line card cage 96. Cage 96 may contain, for example, other input/output devices, for example, those available from the Westinghouse Electric Corporation, assignee of the present invention, and sold under the trade name "Q-line point cards". These then make actual connection to plant sensors, position actuators and the like, as indicated on the drawing of FIG. 6. Accordingly, if the drop is to function in accordance with a peripheral which is directly Multibus compatible such as an operator terminal or the like, it is simply connected to the Multibus 92. On the other hand, if specialized process control is desired, an MBU unit 94 can be used to interface the Multibus to the distributed input/output bus 86 and the plant sensors can then be attached to the Q-line card cage 96 (or any other desired bus system) as indicated in FIG. 6. In FIG. 6 it will be observed that the MBC 72, which is the data highway communications (Modem) card, the MBD 64 which is the data highway processor card, and the MBS 62 which is the shared memory card, are all referred to as making up the DHC or data highway controller 98. The MBT or transceiver can also be mounted here. These four cards then comprise the means making the interface between the functional processor 60 and the data highway bus 70.

Details of the components of the data highway controller (DHC) 98 and the communications scheme are discussed in the first group of previously filed applications referred to in the Cross-Reference.

4. Ladder Diagram Linesolver

Figure 7:
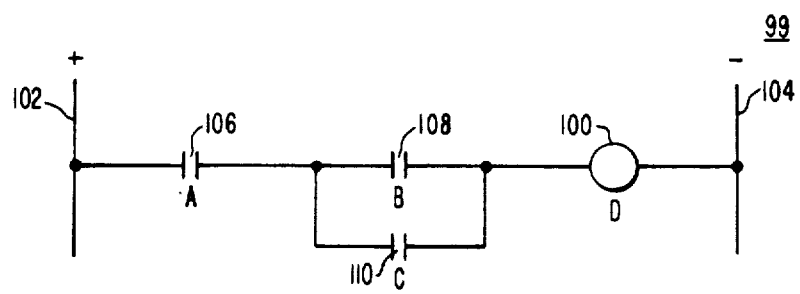
FIG. 7 shows a typical ladder diagram.

The single board linesolver (SBL) modification to the general purpose functional processor 60 allows the capability of solving ladder logic diagrams with the speed of programmable controllers. The aforementioned Intel Corp. Model No. SBC 86/05 single board microcomputer can be modified to interface the SBL module 95 via the Intel iSBX TM expansion port interface as defined by Intel Manual Order Number 142686-002. The SBL module 95 permits the drop to perform sequential control of the process based upon the solution of freeform ladder diagrams. The ladder diagrams provide a means of representing Boolean logical expressions in a form that may be visually interpreted. The logical AND function is represented by a series connection of two "contacts", while a logical OR function is represented by a set of "contacts" in parallel connection. FIG. 7 shows a typical ladder diagram 99 which is the equivalent of the Boolean expression $D = A \times (B+C)$. The solution to the ladder diagram 99 is in the form of a coil 100 whose digital value is determined by the power flow from the positive power leg 102 on the left through the closed contacts in the ladder diagram to the coil 100 and the negative power leg 104 on the right. Thus, coil 100 (D) is TRUE if contact 106 (A) AND either contact 108 (E) OR 110 (C) are also TRUE. The topography of the ladder diagram 99 may be converted to executable code which represents its topography. It is this code, generated by the functional processor 60 in response to application program instructions, which is solved by the SBL module 95.

For a ladder diagram which has been defined to include seven rows of contacts, one or more contact columns, and from one to seven coils, the executable code includes the following information items:

1. The memory address in the functional processor storing the digital information representing the existing status of each contact in the ladder (I/O 16-bit image word);

2. For each contact in the ladder, the corresponding bit number or position in the I/O image word containing the existing status of that contact;

3. The contact number of a contact in a column which for a seven row column allows contact numbers 0 to 6;

4. An identifier flag bit which indicates whether the contact is a normally open or normally closed contact;

5. For each of the six possible vertical connections between the seven contact rows in a given column which form logical OR terms, an identifier bit indicating whether such a connection exists;

6. An identifier flag indicating the last contact in a column has been reached;

7. Seven bits indicating the seven power flows each corresponding to a row of a seven-row column of contacts.

These information items are represented in tabular form as follows:

| | | | | | | | | DATA | | | | | | | | | Function |
|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | | |
| x | x | x | x | x | x | x | x | x | P6 | P5 | P4 | P3 | P2 | P1 | P0 | | Power Flow |
| EN | x | 05 | 04 | 03 | 02 | 01 | 00 | NC | C2 | C1 | C0 | B3 | B2 | B1 | B0 | | Contact Type |
| WF | WE | WD | WC | WB | WA | W9 | W8 | W7 | W6 | W5 | W4 | W3 | W2 | W1 | W0 | | I/O Image Word |

| Item | | |
|---|---|---|
| 1 | WF-W0 = | I/O Image Word bits (0 through 0FFFFHex) |
| 2 | B3-B0 = | Bit Number of a contact in its I/O image Word (0 through 0FHex) |
| 3 | C2-C0 = | Contact Number (0 through 6) of a contact in a column |
| 4 | NC = | Normal Closed (0 or 1) = Normally open/ |
| 5 | 05-00 = | OR Terms (0 through 3FHex) for the contacts in a column |
| 6 | EN = | Enable the calculation of the new Power Flow after the I/O Image Word of the last contact is loaded |
| 7 | P6-P0 = | Power Flow (0 through 7FHex) of a particular column |

The executable code incorporating all of the above information is presented by the functional processor 60 as data for use by the SBL module 95. The SBL module 95 operation, once this data is presented, is summarized by four steps: (1) Set Power Flow; (2) Set Contact Type; (3) Set I/O Image Word; (4) Read Power Flow.

The SBL module 95 must first be initialized to set the seven power flows entering a given seven-row column of contacts. For the left most column in a given ladder diagram, the initial power flows will all be set TRUE since the left power leg is connected to all of the contacts in that column. The functional processor 60 then must output sequentially, for each contact in a column, first a contact type which describes the characteristics of that contact, followed by the I/O image word which provides the physical state of the contact in that column. The contact type has already been described in information items 2 to 6 above. For each of the contacts in a column, the contact type and the I/O image word are loaded and on the last contact in a column the enable bit in the contact type is set, causing the SBL module 95 to calculate the power flow for that column.

The functional processor then can proceed to subsequent columns in a like manner loading contact type and I/O image word for each contact in that column and as before, upon reaching the last contact, the enable bit is set in the contact type word. Upon completing all of the contacts in all of the columns of a ladder diagram, the output power flow of each of the seven rows of the ladder diagram may be read by the functional processor 60 from the SBL module 95. These output power flows or coils may then be used by the functional processor 60 to either set physical outputs on the Q-line point cards or set outputs to be originated on the data highway or set what are known as internal coils within the data highway controller memory 62 for use as inputs to subsequent ladder diagrams.

Figure 8:
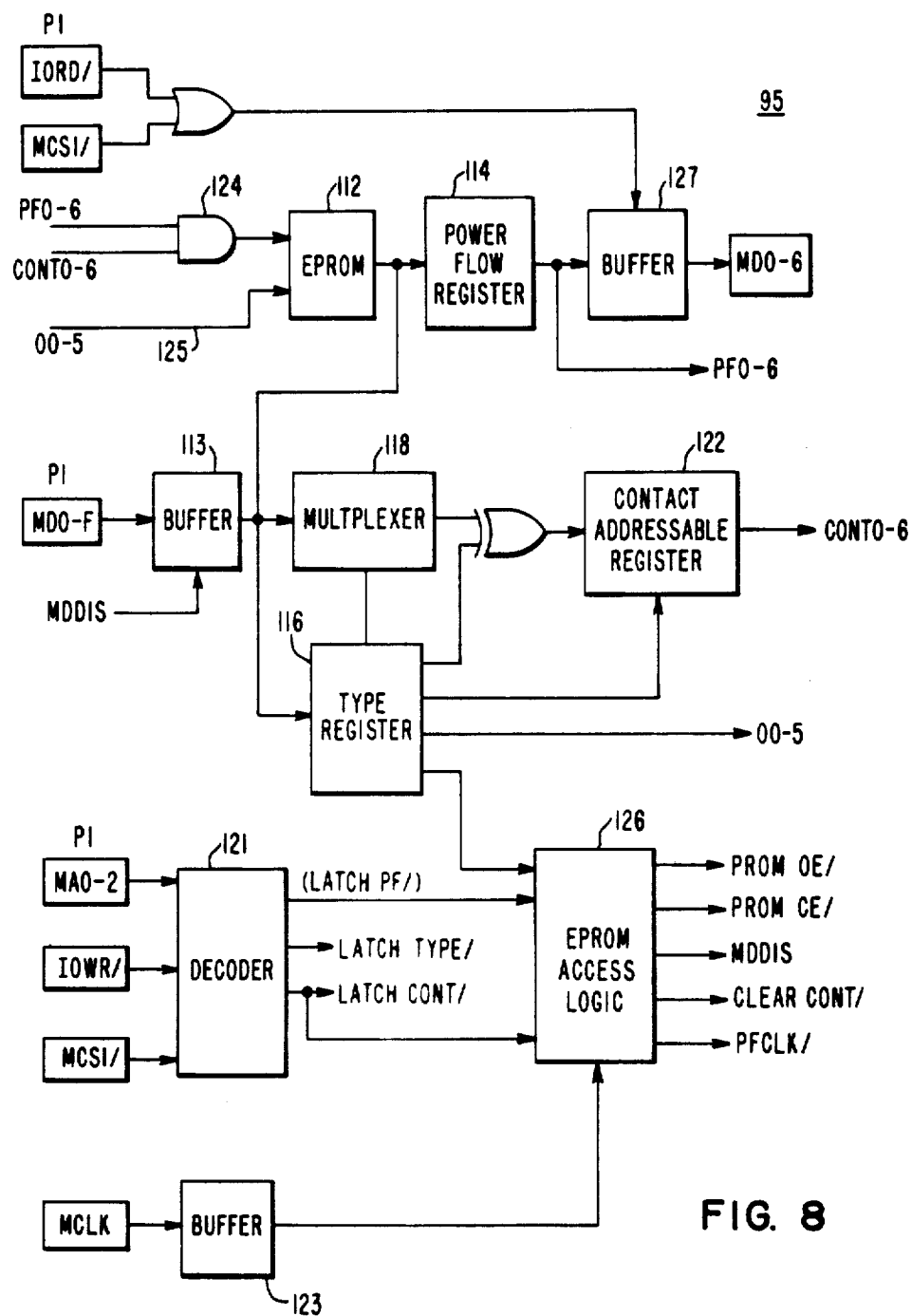
FIG. 8 shows a block diagram of the single board linesolver.

In the preferred embodiment, the block diagram of the SBL module 95 is as shown in FIG. 8. The 8 K×8 electrically programmable read only memory 112 (EPROM) performs AND/OR logic to provide the power flow of a particular column which it is solving. The AND/OR logic is based upon combination of the state of the seven power flow terms from the previous column with the seven contact values and six OR terms of the present column. This is accomplished by having the microprocessor 60 load the SBL module 95 with three different pieces of information. The first of these is the preset value of the power flow (initially all TRUE) which is loaded via the buffer 113 into the power flow register 114. The microprocessor 60 also loads the SBL module 95 with the contact type into the type register 116, the type register 116 containing the five fields of descriptive information previously described.

The third piece of information that the microprocessor 60 provides the SBL module 95 is the I/O image word itself which is fed to the SBL module 95 through a 16 to 1 multiplexer 118, the output of the multiplexer 118 determined by the four bits (B0 to B3) contained in the first field of the contact type word stored in the type register 116. These four bits specify a value from 0 to 15 which corresponds to the bit number of the contact in the I/O image word. The output of this 16 to 1 multiplexer 118 is fed to exclusive OR gate 120 along with the normally closed bit which is in the third field of information in the contact type word. This result determines the actual value of the contact from the I/O image word. This value is then loaded into the contact addressable register 122, this register 122 being addressed by the value contained in the second field of information (C0 to C2) of the contact type word corresponding to the row number of a contact in a particular column. The outputs of this contact addressable register 122 are then fed to AND gate 124 along with the seven previous power flows from the power flow register 114 and are in turn presented to the 8 K×8 EPROM 112 along with the six OR terms signal 125 for subsequent calculation of the power flow of a column as described before.

Additional logic on the SBL module 95 is used to determine whether the microprocessor 60 is outputting power flow, the contact type word or the I/O image word itself. In addition, decoder 121 feeds address and control signals to the EPROM access logic 126 to read a location from the EPROM 112 addressed by the six OR terms signal 125 and the result of the AND function performed by gate 124 using the seven power flow terms and the seven contact values. This location contains the output of the EPROM, which is the new seven bits of power flow to be used as inputs for a particular column. A timing signal from buffer 123 controls when the EPROM access logic 126 generates the signals to enable the read of the EPROM 112 as well as to load these outputs into the power flow register 114 and buffer 127. In addition, the contact addressable register 122 is cleared after this operation in preparation for the calculation of the power flow in the subsequent column. This procedure is repeated for the number of columns in the ladder diagram, after which that ladder diagram is considered as having been solved. Additional ladder diagrams may then be solved, and these may be either dependent or independent of the solution to the first ladder diagram.

5. Engineer's Console

In accordance with the principles of the invention, the engineer's console 28 is the basic tool used by a design control engineer either to develop a required control program or to monitor and control the industrial process operating in accordance with that control program. In the control program development mode, the engineer's console 28 provides the engineering capability for control program development, including extensive file management functions and the use of various program processors. It also provides the capability of burning programmable read only memory (PROM) chip and downloading programs and files to other drops in the system via the data highway. The application program once developed at the engineer's console 28 can be downloaded via the data highway into a DPU and stored in the shared memory 62 for execution. In the control operation mode, the engineer's console 28 provides the primary interface between the operator and the industrial process by means of color graphic CRT displays and a touch-sensitive keyboard.

Figure 9:
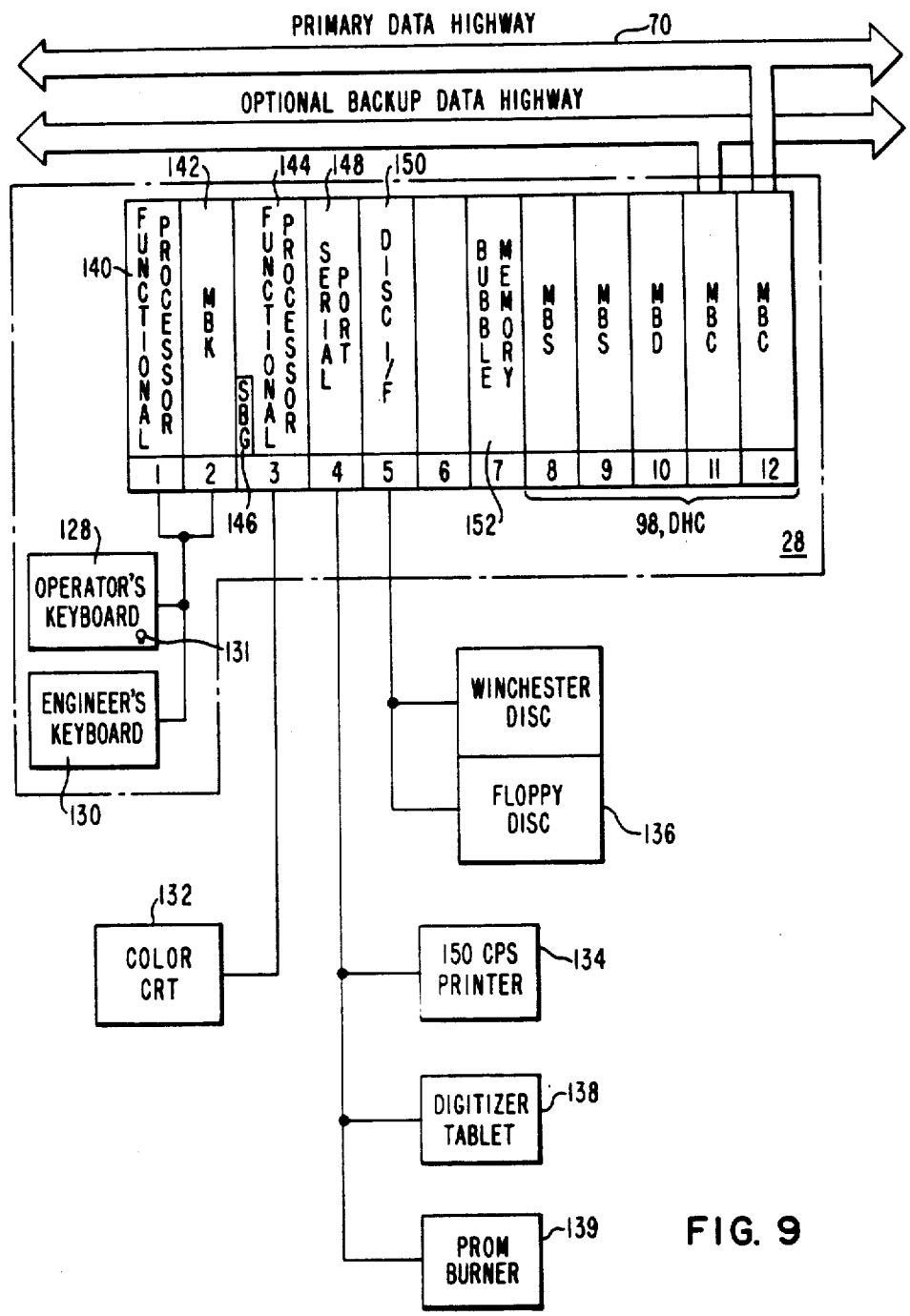
FIG. 9 shows a basic hardware configuration of an engineer's console.

FIG. 9 shows the engineer's console basic hardware configuration. Because the engineer's console 28 is another type of drop on the data highway, a similarity with the arrangement of FIG. 6 is seen in that the data highway controller cards 98 are used to maintain communications with the data highway 70. However, because the function of the engineer's console 28 differs from that of a standard DPU, the remaining hardware is different. Noticeably absent is the DIOB connection to the Q-line card cage for local process I/O interface. Instead, a number of peripheral devices are interfaced with the hardware of the engineer's console 28. Each of these peripheral devices and its purpose is now described.

The operator's keyboard 128 is a touch-sensitive keyboard which allows the operator to interface with the process when the engineer's console 28 is operating in the control mode of operation. The operator cannot make changes to the application programs which are stored in any of the DPU units operating in the system. This ability is, however, provided in the control program development mode throug use of the engineer's keyboard 130. The engineer's keyboard 130 is enabled through the key switch 131 located on the operator's keyboard 128 to restrict this control program development mode to use by authorized personnel.

The engineer's keyboard 130 is a standard keyboard device for input of alphanumeric information, which is displayed on the color CRT screen 132 as well as for control of the cursor on the CRT screen 132. The color CRT screen 132 is also used to display diagrams representing the industrial process and for display of tuning parameters which can be modified during the control mode of operation. The color CRT 132 is used to aid the operator during the iinteractive programming effort when the engineer's console 28 is employed in the control program development mode.

A standard peripheral printer 134 is used for hard copy records of program listings and other operator actions. A Winchester/floppy disc drive peripheral 136 is used as the primary storage facility for all programs and data contained in the engineer's console 28. The floppy disc portion serves as the input medium for storing programs and data onto the Winchester disc. The floppy disc also serves as secondary storage for saving programs and data written from the Winchester disc. A digitizer tablet peripheral 138 is used as an input to simplify the creation or editing of CRT display diagrams when the engineer's console 28 is used in the control program development mode. A PROM burner 139 can be used to burn programs (written from the Winchester disc) in PROM's for direct insertion into the hardware of a DPU.

All of the aforementioned peripherals are connected to the engineer's console 28 via a series of cards designed for this purpose. The functional processor 140, like the functional processor 60 used in the DPU, is a 16-bit microcomputer available from Intel Corp. under Model SBC86/05. The MBK board 142 is designed in accordance with skill of the art techniques to interface the functional processor 140 to the operator's keyboard 128 and engineer's keyboard 130. The connection of the MBK board 142 to the functional processor 140 is a single synchronous serial data link. The MBK board 142 scans the two keyboard peripherals 128 and 130 to detect contact closures, each of which has been encoded with the ASCII convention.

Another functional processor 144 in the engineer's console 28 is a modification to the SBC86/05 hardware. This is accomplished using an internal display generator SBG module 146 which enables this processor 144 to control the CRT. The SBG module 146 is designed in accordance with skill of the art techniques to interface the functional processor 144 with the CRT screen 132 to provide the operator with an up-to-date display of system data. As with the previously described SBL module 95, the SBG module 146 is designed to be mounted as an iSBX TM module to the 86/05 functional processor. Commands and data are transferred from the functional processor 144 to the SBG module 146 to create the desired pattern on the CRT screen 132. The heart of the SBG module 146 is the graphics display controller, which receives commands and data from the functional processor 144 and converts them into the proper data to be stored in one of four memory planes, each corresponding to a color output on the CRT screen 132. The graphics display controller scans these memories at the proper rate, as defined by the commands received from the functional processor 144, so that the video and sync signals are produced. The graphics display controller provides the sync signals directly and provides the memory addresses and control signals.

The interface of the digitizer tablet 138 and printer 134 as well as the PROM burner 139 is provided by an SBC 86/05 functional processor used as a serial port interface 148. The Winchester/floppy disc drive peripheral 136 is connected to the engineer's console 28 via a controller board 150 such as that available from Scientific Microsystems under Catalog FWD 8001. This multibus compatible Winchester/floppy disc drive controller board 150 controls the input/output operations involving this peripheral device 136.

Another part of the engineer's console 28 hardware includes a high-density non-volatile read/write memory, such as the bubble memory board 152 available from Intel Under Catalog iSBC 254S. This board has a 1-megabit bubble memory capacity.

The remaining hardware in the engineer's console 28 is comprised of data highway controller cards 98 which are as described in the series of patent applications previously referenced.

6. Software Structure

The software structure of the DPU according to the present invention is made up of execution software and support software. The execution software is a collection of the individual data acquisition and process control programs which are directed to control of the various segments of the process. These programs are initiated, performed in a consecutive fashion, and repeated at specific intervals. The execution of the process loop occurs in phases, in accordance with the phase diagram shown in FIG. 20 as described further herein. The support software initiates process loop execution. It also ensures error-free interaction between the hardware and the execution software by monitoring timing of the software execution, making calls to subroutines and algorithmic procedures required by the execution software, and running diagnostic testing.

DPU PROGRAMMING

The aforementioned execution software which forms the process loop is created in the DPU using a programming language which is problem-oriented. Because it is a high-level language, it is uniquely suited to the needs of process control design engineers. That is, the programming language itself uses symbolic representation which is familiar to design control engineers as programming statements. In combination with conventional text statements, the DPU programming language of the present invention provides the execution software for use by the DPU itself.

The DPU programming language is used to program and configure the memory of distributed processing units (DPU's) to perform data acquisition functions, continuous modulating control and sequential control. The language operates as an editor in text and graphic modes on the engineer's console drop 28 which is connected to the data highway 70. This interactive subsystem enables the user to observe the control loop and ladder logic configurations on a CRT screen 132 as he enters them for programming purposes.

There are four main modes of the DPU programming language:

Edit Data Base I/O—Generates the DPU data base by allowing the user to define the process points that are originated, received or local to the DPU using a text fill-in-the-blanks format and the engineer's keyboard 130.

Edit Text Control—Configures process control loops by allowing the user to define ISA and SAMA algorithms using a text fill-in-the-blanks format and the engineer's keyboard 130. Loops are placed in the memory of the DPU for execution.

Edit Control Loop—Configures continuous process control loops of special graphic algorithms by allowing the user to draw a picture of the loop, using the digitizer tablet 138 that is displayed on the CRT screen 132. The loops are placed in the memory of the DPU for execution.

Edit Ladder Control—Defines sequential control logic with ladder diagrams by allowing the user to draw a picture of the ladder, using the digitizer tablet 138 as displayed on the CRT screen 132. The ladders are placed in the memory of the DPU for execution. The ladder mode of the programming language includes special function algorithms such as times and counters.

An existing control loop or ladder diagram which has been programmed into the DPU may be monitored at an engineer's console drop 28. Two modes exist for this purpose:

Control Loop Monitor Mode—This allows the user to display a graphic continuous process control loop and select a real time trend of an algorithm's process variable input. The user may also tune any algorithms displayed in this mode via a tuning subscreen.

Ladder Monitor Mode—This allows the user to display a ladder diagram which is currently executing in the DPU. The current states of all of the contacts and coils in the ladder diagram are shown, and the user may force certain contacts and coils manually to desired states in this mode.

The programming language is accessed at an online engineer's console drop 28 by typing the appropriate command on the engineer's keyboard 130. At this point, the CRT screen 132 displays the available editing modes of the programming language and the associated function keys on the engineer's keyboard 130 which serve to select the various modes. In each mode, the engineer's console 28 awaits receipt of operator-chosen information which is entered via the digitizer tablet 138 or the engineer's keyboard 130 depending on the editing mode originally selected.

The method of using the DPU programming language is revealed in the set of flow charts beginning with FIG. 10 through FIG. 19. These flow charts taken together represent the activities in which an operator develops a DPU application program as part of the control program development mode. As an aid to understanding the flow chart, a convention has been adopted in which a rectangular editor block represents an action performed by the system hardware and software of the present invention; a parallelogram entry block represents a user interaction point at which operator information is entered in response to a prompt by the CRT screen 132.

Before the DPU can be programmed, certain system parameters which it requires must be established in a configuration mode. These parameters include the number of the DPU units within the system, the process control loop time in which the DPU will execute the application programs which it contains, the English description of the functions the DPU performs, the number of time slots which the data highway has allocated for access by each particular drop in the time division multiplexing scheme, and the number of I/O interfaces associated with each drop for proper allocation of I/O address space within the shared memory of each DPU. The information contained in this initial configuration can be downloaded to the DPU after which the control program development mode can be entered. Once the control program development mode has been used to develop application programs for the DPU, the configure mode can also be used to save the application programs so developed after they have been downloaded and are executing in the DPU. The user can save these application programs in a file in the engineer's console 28 and can later use this file to redownload a previously saved application program.

Figure 10:
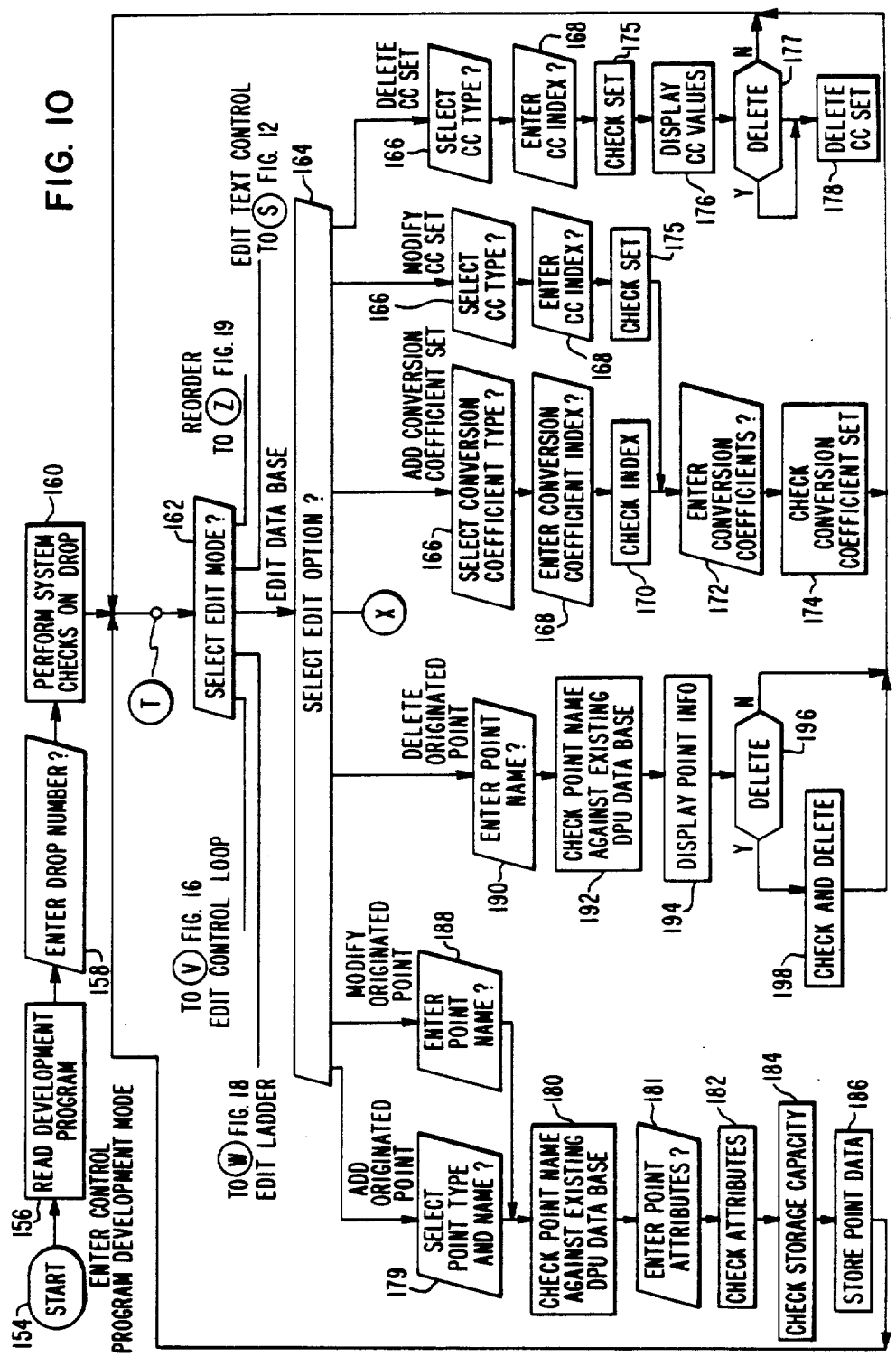
FIGS. 10, 11 and 12 show a portion of a flowchart for programming a drop.
Figure 11:
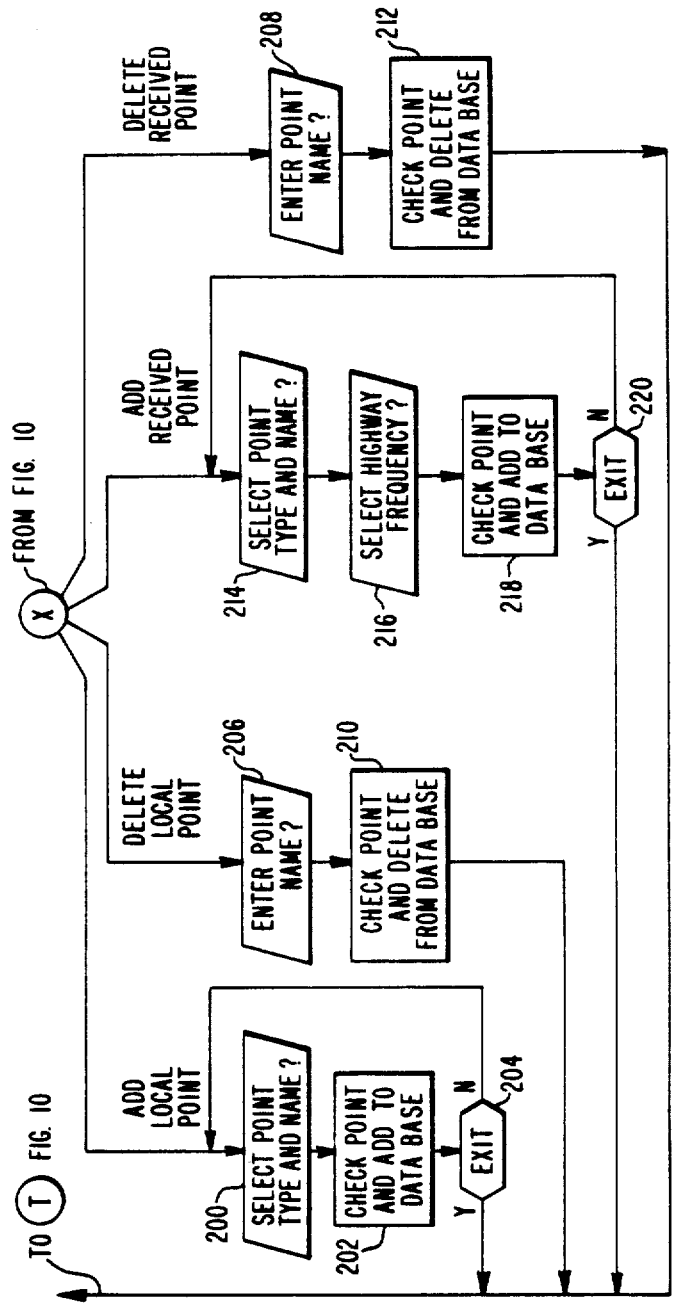

Initiation of the control program development mode begins with the start block 154 shown in FIG. 10 at which point the operator types the initiation command on the engineer's keyboard 130 which has been previously enabled for use. When so typed, the system enters the control program development mode at which point editor block 156 causes the functional processor 140 in the engineer's console 28 to read the development program previously stored in the Winchester disc peripheral 136. This development program controls all of the DPU programming activity as described further herein by the system flow charts.

The first step in developing a control program for a DPU is the entry of the appropriate DPU drop number. Entry block 158 prompts the user to select a number in the range of 1 to 254, depending upon the number of DPU's which form the system. The drop number serves to identify the particular drop which is being edited in the control program development mode. In response to this entry, editor block 160 performs a number of checks on the drop so identified. These checks include determination of whether the identified DPU is attached to the data highway, and whether the edit mode for that DPU is already in progress. Entry block 162 prompts the user to select an editing mode to be used as the method for developing a control program.

The following is a discussion of the four main editing modes previously outlined which are available within the control program development mode of operation. The reorder and self-documentation and process loop execution modes of operation are discussed subsequently. EDIT DATA BASE In FIG. 10, when entry block 162 prompts the user to enter an edit mode selection, the CRT screen 132 displays several function key numbers and their labels corresponding to the various edit modes. The function keys are found on the engineer's keyboard 130, and for example, selection of function key 1 designates selection of the edit data base mode. This mode is used to add, delete, or modify the process points and conversion coefficients that are contained in the data base of the DPU being programmed. The user enters the data base information on the engineer's keyboard 130 in response to the fill-in-the-blanks format which is displayed on the CRT screen 132 when this mode is selected.

Entry block 164 prompts the user to select an edit option within the edit data base mode. Again, the set of function keys is displayed on the CRT screen 132 with labels corresponding to the various edit options.

In building the DPU data base, the user must both define the process points containing the process variable information as well as the conversion coefficients which make the values of the process variables usable for control purposes. Conversion coefficients are sets of real numbers that are used by the DPU operating in the analog input scan routine to convert the input values to engineering units. The following types of conversions are available: linear, square root, polynomial (fifth order), square root polynomial, function generator, and exponential. These conversions are shown in the following table:

| Type | Description | Equation |
|------|-------------|----------|
| LN | Linear | $Y = C_1X + C_2$ |
| P5 | Fifth Order Polynomial | $Y = C_1 + C_2X + C_3X^2 + C_4X^3 + C_5X^4 + C_6X^5$ |
| SQ | Square Root (SQRT) | $Y = C_1 [SQRT (X + C_2)] + C_3$ |
| EX | Exponential (EXP) | $Y = C_1 [EXP (C_2X)] + C_3$ |
| SP | SQRT of Fifth Order Polynomial | $Y = SQRT$ (Fifth Order Polynomial Y) (See Entry P5 above) |
| F6 | Six-Segment Function Generator | Coefficient x, y pairs are: $(C_1, C_8)$ $(C_2, C_9)$ $\downarrow$ $(C_7, C_{14})$ If $x \leq C_1$, $y = C8$ If $x \geq C_7$, $y = C14$ If $C_1 \leq x \leq C_8$, $y =$ value of the y-coordinate for a corresponding x-coordinate. | where:
X = Original input value which is converted to Y engineering units by the specified type of conversion
Y = Final, converted value of the analog input
$C_1$ through $C_{14}$ = Conversion coefficients To add a conversion coefficient set, the appropriate function key is selected in response to the prompt from the entry block 164. At this point, entry block 166 prompts the user to select a conversion coefficient type from those available in the above table. Entry block 168 prompts the user to enter a conversion coefficient index, which numerically designates the set of conversion coefficients to be entered. Editor block 170 then checks the index to see if it is an index that has already been selected and, if not, it assigns that index to the conversion coefficient set. Entry block 172 prompts the user to enter the individual conversion coefficients forming the set for the conversion coefficient type already selected. Editor block 174 checks the conversion coefficient set just entered to see if there are many invalid entries, and to allocate storage in the DPU data base. At this point, the system returns to the entry block 162 to prompt the user for another edit mode selection.

An existing conversion coefficient set may be modified or deleted by an appropriate user response to entry block 164. Entry blocks 166 and 168 serve the same purpose in either of these options as described above, with editor block 175 checking the existence of the conversion coefficient set in the DPU data base for each option. For the delete option, editor block 176 displays the existing information, to which the user responds in entry block 177, with deletion performed in editor block 178.

While still in the edit data base mode, the user must define the process point types which are to form the DPU data base. There are three process point types:

Originated point—a global process variable that is processed in the DPU being programmed and is broadcast over the data highway. This point type may be added, modified or deleted. An originated point name must be unique within the distributed control system.

Received point—a process point that is generated by a drop other than the DPU currently being programmed and is received from the data highway by the DPU being programmed. This point type may be added or deleted, but may not be modified.

Local point—a process point that is processed in the DPU being programmed. It is not broadcast over the data highway. This point type may be added or deleted, but may not be modified. A local point name must be unique to the DPU being programmed.

Each point in the data base is assigned a unique name by the user. An alphanumeric set of 8 characters is used for this purpose.

To add an originated point to the DPU data base, the user must select the appropriately labelled function key in response to entry block 164. Entry block 179 prompts the user to select the point type and name which is to represent that particular process point in the DPU data base.

An individual DPU data base can contain data for process points having analog values, known as analog points, as well as data for process points having digital values, known as digital points. Each type of data is structured into an individual record, and each record type has certain fields associated with it. Each field is a category of information about the process point. For example, a digital process point record has fields which contain information such as an English description of what the point represents, the meaning of its digital states, and the physical location from which the digital point data is derived in Q-line hardware of the DPU. An analog process point record type may contain fields having information such as the English description of what the point represents, and alarm limits defining the appropriate range of the process variable associated with that analog process point.

Once a process point type and name has been selected, editor block 180 checks that point against the existing data base within the DPU being programmed. Entry blank 181 prompts the user to enter the point attributes, which is the set of information contained in the various record fields for a given point type. The CRT 132 displays the possible record fields for the point type already selected, and the user has the opportunity to enter information in each record field. Editor blocks 182, 184 and 186, respectively, check the entered attributes of the selected point, the storage capacity of the DPU data base, and ultimately store the point data in that data base before returning the system to entry block 162 for selecting an edit mode in which to proceed.

The edit data base mode can also be used to modify an originated point by selecting the appropriate function key in response to entry block 164. Entry block 188 then prompts the user to enter the point name, which is then checked by the editor block 180. Point attributes are then entered in accordance with the edit option for adding an originated point as already described.

The delete originated point edit option can be selected by the appropriate function key in response to entry block 164. Entry block 190 prompts the user to enter the point name, after which editor blocks 192 and 194, respectively, check the point name and display the information about that point before entry block 196 prompts the user to decide whether to delete that point from the data base. Editor block 198 deletes the point unless the user chooses not to do so, either choice returning the editor to entry block 162.

In similar fashion, the edit option for adding a local point (FIG. 11) can be selected using the appropriately labelled function key in response to entry block 164. Once the point type and name has been selected in response to entry block 200, editor block 202 checks the point name and adds the point to the data base in the DPU. Entry block 204 enables the user to exit from this mode or repeat it.

The two edit options for deleting a local point or deleting a received point are very similar, each selected by using the appropriate function key in response to entry block 164. Once the point name has been entered in response to entry block 206 or 208, editor blocks 210 or 212 check the point and delete it from the data base. The edit option for adding a received point requires the user to select the appropriate function key in response to entry block 164, and then to select the point type and name in response to entry block 214. In addition, the highway frequency with which the point is to be accessed from the data highway must be chosen in response to entry block 216. Then editor block 218 checks the points and adds it to the data base. Entry block 220 provides the user with the opportunity to exist from this option or repeat it.

EDIT TEXT CONTROL

The technique for developing control program software algorithms in the edit text control mode is based on the use of modular functional control blocks contained in an algorithm library. A similar technique has been described in a portion of previously filed patent applications Ser. Nos. 562,378; 562,507 and 562,508 filed Dec. 16, 1983 and Ser. No. 635,387 filed July 30, 1984, referred to in the Cross-Reference.

The functional control blocks are individual software execution instructions designed to replace the tasks which a typical analog or digital control loop needs to perform. The set of available functional control blocks forms the algorithm library and includes arithmetic blocks, limit blocks, control blocks, I/O blocks, auto-/manual blocks (for manual set point entry and control), and miscellaneous blocks. The miscellaneous category includes functions for generating analog and digital values, generating polynomial functions, gating one of two analog signals based on the logic of the mode signal, time delays, etc. The application program is formed by interactive entry of functional control block names on a line-by-line basis. In accordance with the present invention, this interactive entry procedure is carried out at the engineer's console drop 28 which is connected to the data highway 70.

The application program is developed by designating each line of the application program with a sequential functional control block number, the algorithm name (from the algorithm library) corresponding to that functional control block, and each of the parameter locations forming the arguments or inputs to that algorithm. Each functional control block chosen by the operator and listed on a line of the application program is task-specific, with only one output, which provides a high degree of flexibility and ease of modification. A translator handles the functional control blocks in the order in which they were entered by the operator. It translates the algorithm name of the functional control block, which the operator understands, into a series of data blocks in the pre-specified operator-chosen order so that each data block has a block number, algorithm number, parameter location, parameter location, parameter location etc. for as many parameters as that particular algorithm requires. The translator also checks the syntax of the operator-entered data, and thereby preprocesses the application program for block-sequential, run-time interpretation by an interpreter in the support software. The support software initiates process loop execution, executing the application program in the DPU using the series of data blocks which the translator has created. The support software calls the algorithms in the order which the user specifies. The support software also routes the answers generated by each algorithm to the correct location in shared memory for use by later blocks in the application program. The support software use of a run-time interpreter eliminates compiling, thereby saving time and increasing the flexibility and ease of programming.

Figure 12:
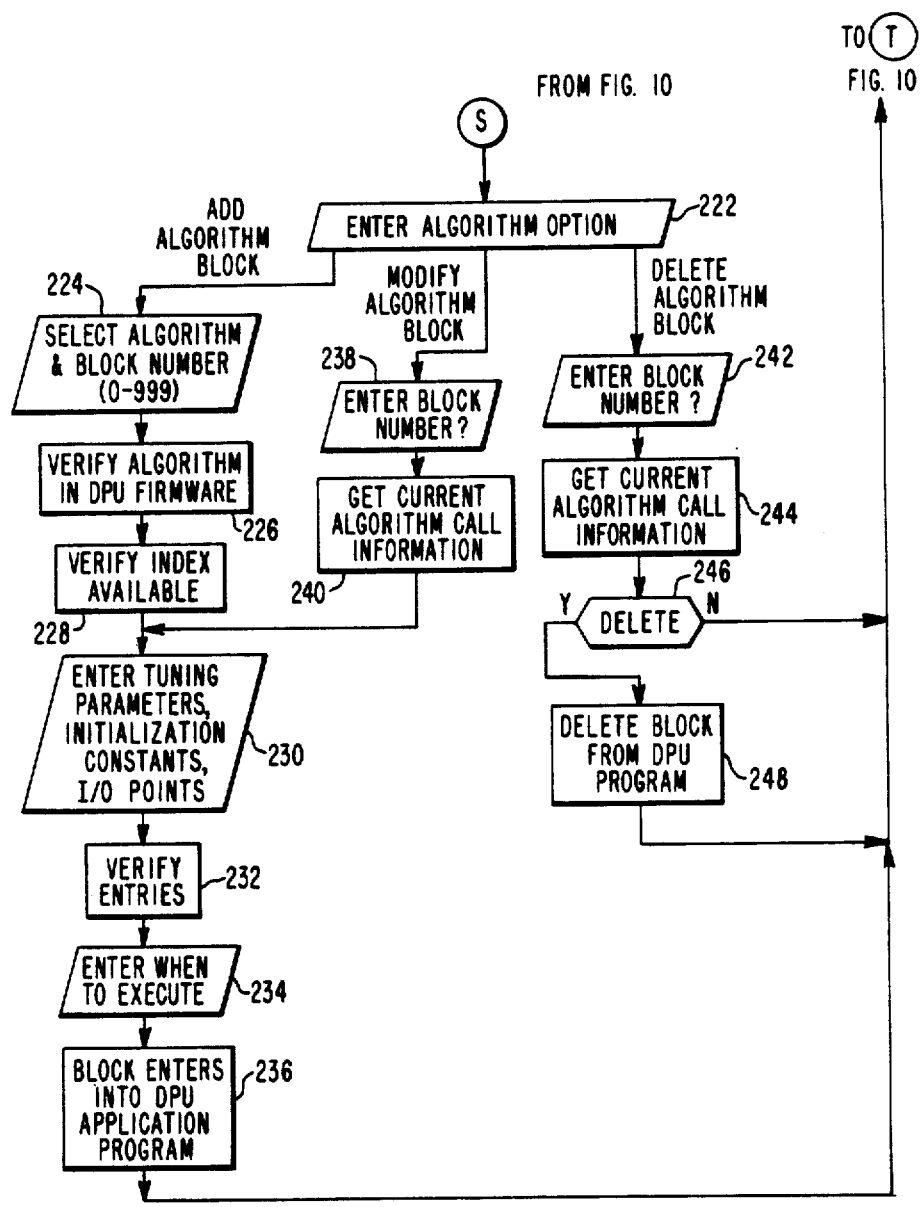

Referring to FIG. 12, once the user has chosen the edit text control mode, entry block 222 prompts the user to enter an algorithm option. To build a control loop in this mode, the user selects the add algorithm block option. Entry block 224 prompts the user to select the desired algorithm and designate the sequential functional control block number. Editor block 226 then verifies the algorithm is contained in the algorithm libray located in the DPU firmware. Editor block 228 then verifies that the sequential functional control block number selected is available. Entry block 230 prompts the user to enter the tuning parameters and initialization constants required by the selected algorithm. These entries are verified in entry block 232, after which the user is prompted by entry block 234 to enter when to execute the algorithm selected in relation to other algorithms or loops being developed. Editor block 236 then enters the functional control block just developed into the DPU application program after which the editor returns to the select edit mode/entry block 162.

The modify and delete options of the edit text control mode are also shown in FIG. 12. Each requires the user to enter the block number to be modified or deleted, after which the editor retrieves the current information regarding that algorithm. In the case of the modify option, the user entries and editor actions subsequent to blocks 238 and 240 follow the format of the add algorithm block option previously described. For the delete option, blocks 242 and 244 identify the desired algorithm, entry block 246 prompts the user to verify that the algorithm is to be deleted, after which editor block 248 deletes the designated block from the DPU application program and then returns to the select edit mode entry block 162.

GRAPHIC EDITING MODES

The two graphic editing modes, edit control loop and edit ladder control, both employ the CRT screen 132 and the digitizer tablet 138 of FIG. 9 to enable the user to develop control programs in an interactive fashion.

Figure 13:
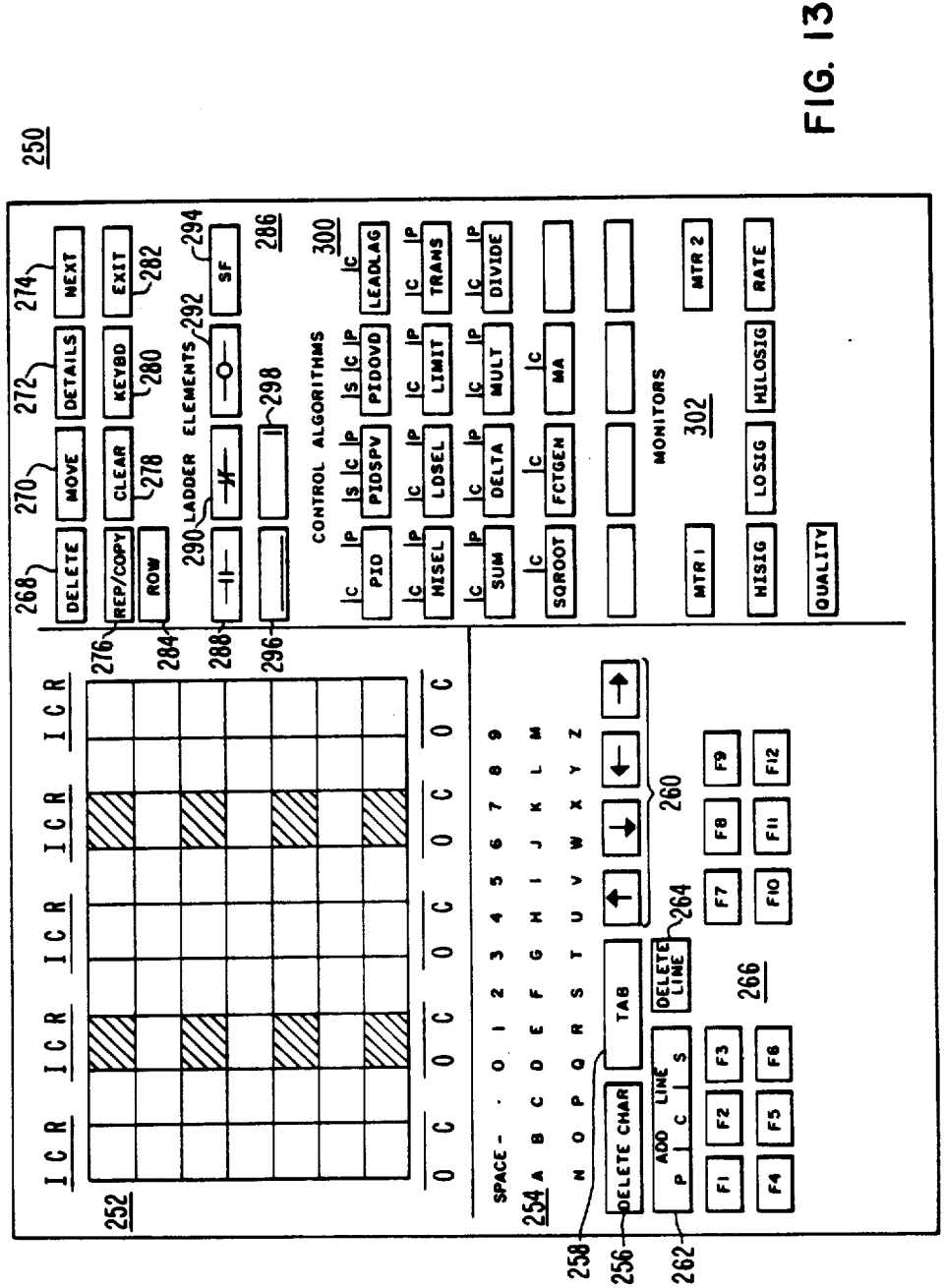
FIG. 13 shows a digitizer pad template.

Referring now to FIG. 13, a bit pad template 250 for use with the present invention is shown. This template 250 becomes an overlay on the digitizer tablet 138, which is a commonly used input entry device for use with computers. The present invention utilizes a digitizer tablet 138 available from Summagraphics and is known as the "bit pad 1" model. This device incorporates a digitizer pen, which when depressed at any location on the digitizer tablet 138 surface, relates the depressed point with its graphic coordinates. This information can be provided via a serial link to the functional processor 148 in the engineer's console drop 28. For any particular template, these coordinates will be related to a predetermined meaning established for the particular template design. The template design of the present invention allows entry of alphanumeric information and process control diagram symbols which are part of the DPU programming language. The user selects functions from the bit pad template 250 by depressing the digitizer pen on the desired function, after which the selection is displayed on the CRT screen 132.

The grid box location area 252 of the bit pad template 250 corresponds to CRT screen 132 locations at which various selected symbols are to be displayed. The row of definition symbols above or below the grid 252 correspond respectively to types of input data and types of output data associated with process control symbols appearing in the grid box locations. The alphanumeric symbol area 254 of the template allows for entry of alphanumeric symbols. The delete character area 256 allows the last character entered to be erased. The TAB area 258 moves the cursor to the next entry field on the CRT screen 132. The cursor movement area 260 allow for motion of the cursor in the directions indicated by the arrows. The ADD LINE area 262 allows for entry of the lines which display the interconnection between the process control symbols such as inputs, algorithms, and outputs; each line is labeled according to the type of process variable it represents, with P representing a process variable input, C representing a cascade input which is calculated within the DPU, and S representing a supervisory input which is received from a remote drop. The DELETE LINE area 264 allows erasure of an interconnection line previously entered. The function tab series of area 266 labeled F1 through F12 represent individual functions which are defined as part of the CRT screen 132 display depending upon the mode of programming being used. In the top right-hand corner of the bit pad template 250, the DELETE area 268 allows erasure of any previously selected contents for a box location. The MOVE area 270 is used in the ladder control editing mode to copy the contents of one ladder cell into another cell and erase the contents of the first cell. The DETAILS area 272 calls up a CRT screen 132 display of additional parameters for the algorithms being added in the text control editing mode. The NEXT area 274 allows the entry of new data to be used for the default tuning parameters and moves the cursor to the following entry field. The REP/COPY area 276 allows the contents of one ladder cell to be copied into a series of other cells. The CLEAR area 278 allows restoration of a selected ladder cell to its previous state. This command must be issued to terminate a REP/COPY command. The keyboard area 280 enables the keyboard function keys and alphanumeric keys on the engineer's console drop 28 to be used. The EXIT area 282 returns the editing procedure to a selected edit mode stage. The ROW area 284 enables the user to clear or delete an existing row, or to insert a new row between two existing rows of ladder elements. If the CRT screen 132 is already full, the user cannot add a row.

The ladder elements area 286 of the template 250 contains the ladder symbols used in the ladder control editing mode. The open and closed contact and coil ladder symbols 288, 290 and 292 can be used to build ladder diagrams for sequential control purposes. The SF ladder symbol 294 allows for the entry of special function algorithms as part of the ladder diagram. The horizontal and vertical line symbols 296 and 298 allow connection of the contact and coil symbols and completion of the ladder diagram.

The control algorithm area 300 of the template 250 contains the group of control algorithms which are selectable in the graphic control loop editing mode. Each control loop is built on a single CRT screen 132 display in this mode and may have up to eight of these algorithms selected, one corresponding to each of the shaded boxes on the grid box location area 252 of the bit pad template 250.

The MONITOR area 302 of the template 250 contains the group of monitor algorithms which are selectable in the graphic control loop editing mode. Each type of monitor algorithm performs a different predefined check on the analog process points in the control loop, such as monitoring signal levels with respect to high or low limits.

EDIT CONTROL LOOP

The edit control loop mode is used to build, modify and delete control loops of special graphic algorithms that are selected from the bit pad template 250 on the digitizer tablet 138. These control loops are ultimately downloaded in the DPU for execution so as to provide the process modulation and continuous control functions necessary for a controlled process. In this editing mode, the grid box location area 252 of the template 250 is used to define algorithm input, output and box locations on the CRT screen 132 as the control loop is being built. Each control loop can have up to five analog input points which must be defined in the edit data base mode. Three types of input points are available:

Field Input (I)—This is a point value scanned from the field input card converted to engineering units and updated before the control loop is executed.

Calculated Input (C)—This is an originated point within the DPU being programmed.

Received Input (R)—This point is generated at another drop that is defined as a received point in the data base.

Above the grid box location area 252 of the template there are five input point or box locations, each labelled I, C and R for the type of input points which can be selected by depressing the digitizer pen on the individual letter desired. In similar fashion, the output points are selectable using the bit pad template 250, and each control loop can have up to five analog output points which must be defined in the data base. Two types of output points are available:

Field Output (O)—This point value is output to the field of the card after the control loop is executed.

Calculated Output (C)—This point is originated in the DPU being programmed.

As mentioned earlier, the algorithms that operate on the input points to produce the output points are those which can be selected from the bit pad template 250 control algorithms area 300. Each of these algorithms is stored in an algorithm library in a manner similar to that described earlier for the edit text control mode. Each control loop may have up to eight algorithms, and their locations are those corresponding to the shaded boxes in the grid box location area 252 of the bit pad template 250. Each of these algorithms may have up to three inputs which are of the following types:

Process Variable Input (P)—Field input point.

Cascade Input (C)—Variable resulting from another calculation within the DPU being programmed.

Supervisory Input (S)—Received process point which is assigned a value by a remote system drop.

Each algorithm may have only one output. The editor names the output points automatically and defines them except when the user draws a line connecting the algorithm to the bottom of the CRT screen 132 or an output box location. These points are instead named by the user. To ensure bumpless transfer when switching system control modes (for example from auto to manual) and to prevent reset (integral) windup, the editor also creates and names intermediate process points between algorithms for tracking and for displaying algorithm set points and deviations. This is accomplished by giving each algorithm additional inputs and outputs which are not visible to the user. The editor automatically creates and deletes these points as needed, and ensures that they are passed from one algorithm to another correctly.

Each input point in each algorithm in a control loop can have up to two monitor algorithms associated with it. A monitor algorithm performs predefined checking on an analog process point and sets a digital process point to a TRUE state if the predefined conditions are met. This information may be used as input for other algorithms. As an example, the HISIG algorithm area 304 defines an algorithm which monitors an analog process point and determines if it is above a predefined limit.

Figure 14:
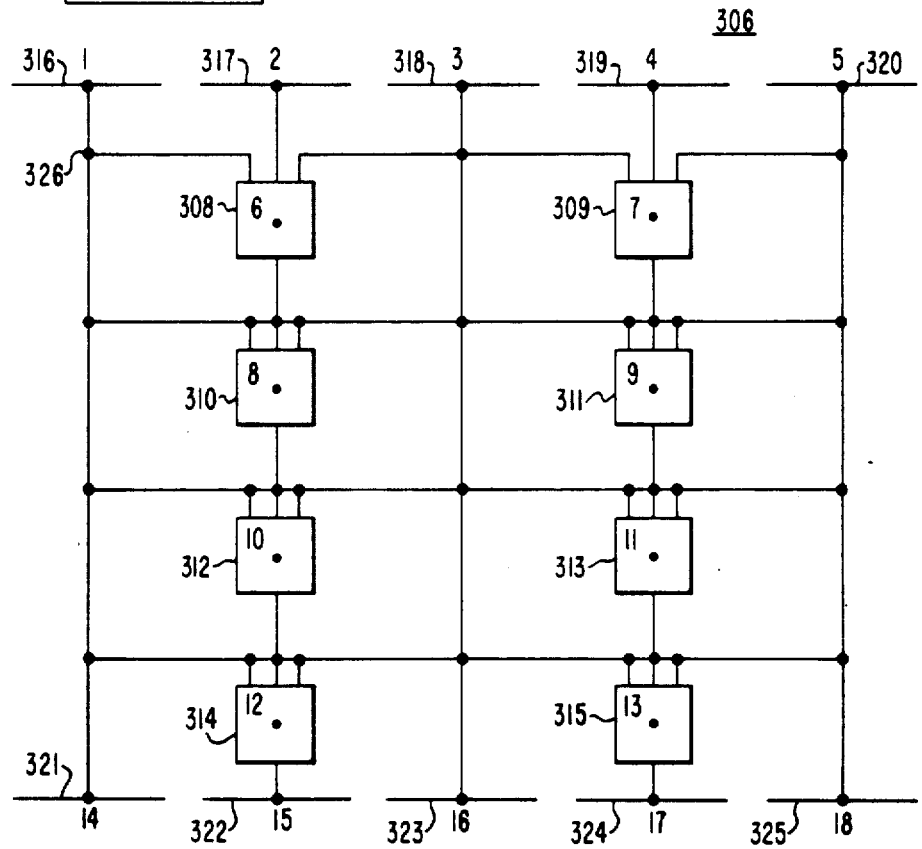
FIG. 14 shows a CRT screen pattern for a graphic control loop diagram.

FIG. 14 shows a pattern 306 of the CRT screen 132 locations which may be developed using the graphic control loop editing mode. There are eight algorithm boxes 308-315, five input box locations 316-320, and five output box locations 321-325. The set of permitted lines which may be drawn to connect the inputs algorithms and outputs is also shown. Initially, the CRT screen 132 displays only the input and output box locations, and gradually the user builds the complete display pattern shown in the figure, or variations within this pattern. The editor observes rules in the building procedure which limit these variations. The user defines the algorithm inputs by drawing lines which connect the algorithms and input boxes. Lines cannot be drawn through an existing algorithm box. A line may be drawn through the algorithm box location if an algorithm has not been placed there. Inputs originating from the left of an algorithm box may be drawn only to the left input location of that algorithm box. Inputs originating as an output of an algorithm box may be drawn only to the center input of the algorithm box directly below. Inputs originating from the right of an algorithm box may be drawn only to the right input location of that algorithm box. User-defined algorithm names are unique and cannot be the same as another point or algorithm in the data base. No two lines may coincide nor intersect unless the lines originate from the same algorithm box or same input box. The editor will not allow the user to build illegal lines.

The editor is capable of detecting a mistake in the building of connecting lines through use of a valid line detection routine. As shown in FIG. 14, incorporated within the set of complete CRT screen symbols used in the building of control loops are nodes (such as that at 326) which define possible connection points for connecting lines. When the user requests a line to be drawn, the editor determines which nodes are required by accessing a look-up table which contains the set of all possible lines that can be drawn between input boxes 316-320 and algorithm boxes 308-315, and between algorithm boxes 308-315 and output boxes 321-325. The editor uses this information along with information contained in a table it creates during the editing procedure. This latter table is the used-nodes array which stores the set of nodes which have been used in drawing lines. By comparing the used-nodes array with the look-up table, the editor determines if the line is valid, and then modifies indices in the used-nodes array to indicate their unavailability in further editing.

Figure 15:
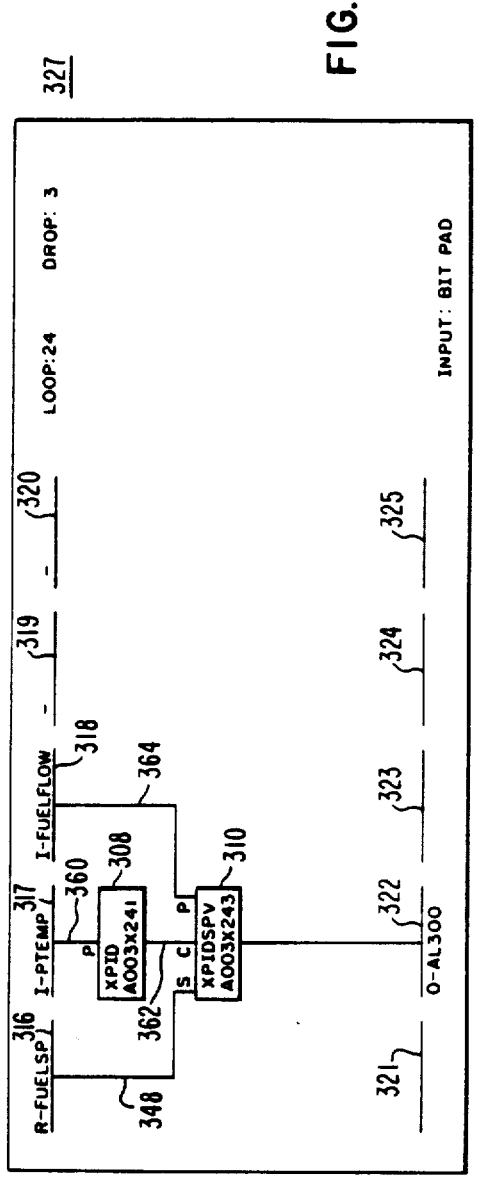
FIG. 15 shows a typical process flow diagram for a portion of a process control system.

FIG. 15 shows the finished version of a sample control loop 327 which may be built in the graphic control loop editing mode on the CRT screen 132. The following is a description of the procedures used to develop this control loop, with the procedures used by the editor shown in the flow chart 328 of FIG. 16.

The user begins the editing procedure at the engineer's console 28 by entering into the control program development mode as discussed earlier. When the editor prompts the user to select an editing mode, the user selects the graphic control loop editing mode. At this point, entry block 330 prompts the user to enter a control loop number to designate the control loop being built. Editor block 332 then checks this loop number to determine if it is already in the DPU being programmed. If it does exist, the DPU sends back the information pertaining to that loop. If not, the editor initializes a memory buffer so that a new loop can be added under that loop number. Once the editor initializes the memory buffer, it puts the basic loop diagram up on the CRT screen 132. As indicated earlier, the basic loop diagram has five input and output boxes and signifies the loop number and drop number on the side of the screen 132, while at the bottom of the screen 132 an indication appears that the input device is the bit pad 250.

At this point in time, entry block 334 of the editor prompts the user to enter an edit option. Typically, the user would enter the inputs and outputs first and to do this the user presses the digitizer pen on the bit pad 250 in the area for the first input box that he desires to define. For our example, input point 316 corresponding to the uppermost left input or first input box of the control loop 327 is defined first and the user presses the digitizer pen to the bit pad 250 over the R in the first input box of the grid box location area 252. This indicates that this first input is a received input, and the editor moves to entry block 336 because an I/O edit option has been selected. At this point, the R is blinking on the CRT screen 132 and the user types into the first entry field the characters for the name of the point, which for our example in FUELSP for fuel set point. As the user enters these characters, they are displayed on the CRT screen 132 and the editor moves between entry block 336 and editor block 338 to display the entered characters.

When the user finishes typing in the characters for that input point, he presses the second input box of the grid box location area 252 to select the second input point 317 of the control loop 327. In the example, he will press the I character on the bit pad 250 on the second input box which designates a field input from the I/O. The editor moves from entry block 336 to editor block 342 to check the validity of the input point already selected for input box 316, and in doing so, the editor asks the DPU if that point really exists and if it is the right type. Assuming that it is, the editor returns to entry block 336 and the second entry field is then selected in response to the I character blinking on the CRT screen 132. The user proceeds by typing in the characters for the name of the second input point 317 and for the example this is PTEMP for process temperature. As this is going on, the editor moves between entry block 336 and editor block 338 on the flow chart 328. Once the name of the process point is in, the user can go on to the third input point 318 by pressing the I character in the third input box of the grid box location area 252 on the bit pad 250, which indicates another field input. The editor moves to editor block 342 to check the entry field for the point in input box 317 in a similar manner as that done for input box 316.

The editor then deals with the entry field for the third input point 318 in entry block 336, so that the user types in the characters for this process point. In the example, this is FUELFLOW. Again, the editor moves between entry block 336 and editor block 338 on the flow chart 328, and when the user is finished all of the input information has been defined. At this point, the user must define the output information, and for the example he selects output box 322. Again, the editor moves to editor block 342 to check the third input point 318, FUELFLOW. In the example, when the user chooses output box 322, he chooses the O character which represents a field output to the I/O. The user then types in the name of the output point 322, which in this case is AL300. As this information is entered, the editor moves between entry block 336 and editor block 338 on the flow chart 328. This completes the first stage of the control loop building procedure.

The second stage of the graphic control loop editing mode is devoted to drawing lines which connect the inputs to the algorithm boxes and the algorithm boxes to the outputs. In the example, the user will first draw the line 348 from input box 316 to algorithm box 310 defining the set point input to that box. To do this, the user presses the bit pad 250 for input box 316. This causes the editor to move to editor block 342 to check the entry field for the output point just created for output box 322. With the selection of input box 316, the user then presses the ADD LINE S area 262 to designate the input from input box 316 as a supervisory input. The editor moves to editor block 350 on the flow chart 328 to check that the entry is valid and then moves to entry block 352 which is the add line edit option.

At this point, the user specifies the destination for the line 348 being added and, in the example, this is algorithm box 310 which is selected by depressing the appropriate shaded area in the grid box location area 252 of the bit pad 250. The editor moves from entry block 352 to editor block 354 to verify that the line 348 being added does not violate the valid line detection routine described earlier. The editor then moves to editor block 356 to verify that the algorithm box 310 selected is available, and from there the editor moves to entry block 358 which is the box edit mode option.

The user may then draw the line 360 between input box 317 and algorithm box 308 connecting the PTEMP process variable 340 to the first algorithm. To do this, the user presses the digitizer pen on input box 317 and the editor moves from entry block 358 to entry block 336, the select I/O edit option. From there, the user would press the ADD LINE P area 262 on the bit pad 250, P representing a process variable input. The editor then moves to editor block 350 to verify that the entry field is valid and then to entry block 352 which is the add line edit option. The user then selects algorithm box 308 as the destination for that line 360 by pressing the appropriate shaded area of the grid box location area 252 of the bit pad template 250. The editor then moves to editor block 354 to verify the line 360 in accordance with the valid line detection routine, and from there moves to editor block 356 to verify the algorithm box 308 is selectable, and from there to entry block 358, the box edit option. Assuming the user then wants to draw the line 362 from algorithm box 308 to algorithm box 310, since algorithm box 308 has already been selected, the user just presses the ADD LINE C area 262 of the bit pad 250 to represent a cascade input to algorithm box 310. The editor then moves to entry block 352 which is the add line edit option. The user then presses the shaded area of the grid box location area 252 of the bit pad template 250 corresponding to algorithm box 310 to indicate the destination for the line 362 being added. The editor moves to editor block 354 to verify the line 362 in accordance with the valid line detection routine, moves to editor block 356 to verify the algorithm box 310 is selectable and then moves to entry block 358 which requires selection of a box edit option. To add the connection line 364 between input box 318 and algorithm box 310, the user presses the ADD LINE P area 262 of the bit pad template 250 to designate a process variable input, and the editor moves to entry block 352 which is the add line edit option. At this point, the user presses the input box 318 on the bit pad 250 to designate the destination of this line 364, and the editor moves to editor block 366 to verify the line 364 in accordance with the valid line detection routine. After this, the editor moves to entry block 336 which is the I/O edit option. To draw the line 368 from algorithm box 310 to output box 322, the user again presses the shaded area of the grid box location area 252 of the bit pad template 250 corresponding to algorithm box 310. The editor moves from entry block 336 to editor block 370 to check the entry, then the editor moves to editor block 356 to verify that the algorithm box 310 is selectable, and then the editor moves to entry block 358 which is the box edit option. The user then presses the ADD LINE area 262 without a P, C or S designation in this case because the line goes to output box 322. The editor then moves to entry block 352 and the user presses the shaded area of the grid box location area 252 corresponding to output box 322, at which point the editor moves to editor block 366 to verify the line 368 in accordance with the valid line detection routine. When this has been done, the editor moves to entry block 336 which is the I/O edit option.

In the third stage of building the graphic control loop, the user enters the names of the control algorithms and the tuning constants with which they operate. To do this, the user selects the algorithm box he wishes to define. In this example, algorithm box 308 is defined by depressing the digitizer pen on the appropriate shaded area in the grid box location area 252 of the bit pad template 250. The editor moves from entry block 336 to editor block 370 to verify the entry field, and from there to editor block 356 to verify the algorithm box 308 is selectable. The editor then moves to entry block 358 where the control algorithm name is selected by pressing the particular algorithm desired from the control algorithm area 300 of the bit pad template 250. If an algorithm was previously entered, selection of the DETAILS area or the bit pad template would cause editor block 371 to display existing algorithm parameters which could then be modified.

In the example, a PID algorithm is chosen, at which point the editor moves to editor block 372 during which time it reads the algorithm template from storage which contains the default tuning and initialization parameters for that control algorithm. This information is displayed on the CRT screen 132, and the editor proceeds to entry block 374 which permits the user to enter desired tuning and initialization parameters. As the user enters these parameters, the editor moves back and forth between entry block 374 and editor block 376. If initialization parameters include non-numerical entries, the user can use the NEXT area 274 of the bit pad template 250 to sequence through the set of descriptors available in completely defining this control algorithm. The editor moves between editor block 378 and entry block 374 during this procedure. Where control algorithm definition requires more pieces of information than can be displayed on a single CRT screen, pages of information are available. When the user is satisfied with the data displayed on the first page of the CRT screen, he presses the DETAILS area 272 of the bit pad 250 at which point the editor moves from entry block 374 to editor block 380 to verify the entries on the current page while displaying those available on the next page of information. The user can then type in and change the entries on the second page and the editor will move between entry block 374 and editor block 376 as these characters are changed.

When the user is satisfied with all of the entries, both the initialization parameters and tuning parameters, then the user finishes the definition of algorithm box 308 by choosing another algorithm box for editing. In this case, the user chooses algorithm box 310 by depressing the digitizer pen on the appropriate shaded area in the grid box location area 252 of the bit pad template 250. The editor moves from entry block 374 to editor block 382 to verify that the entries on the last page of information are correct. This information is then stored in a memory buffer, and the editor moves to editor block 356 to verify that algorithm box 310 is selectable, and from there the editor moves to entry block 358 which is the box edit option. At this point, the user depresses the digitizer pen in the control algorithms area 300 of the bit pad template 250 to define the algorithm selected for algorithm box 310. In the example, this is the PIDSPV algorithm. The editor moves from entry block 358 to editor block 372 to retrieve from storage the algorithm template, default parameters and initialization and tuning constants as was done earlier for algorithm box 308. The user then verifies that the entries are correct or makes adjustments as necessary by typing in appropriate characters. As he does this, the editor moves between entry block 374 and editor block 376. If a transition to the add line edit option entry block 352 is needed at this point, the user depresses the ADD LINE area 262 and the editor block 379 verifies the data just entered for the algorithm edit option in entry block 374 before moving to entry block 352. The user may wish to monitor an algorithm box by selecting a monitor algorithm in entry block 381. If the monitor is deleted, editor block 383 verifies its output is not used. An algorithm and monitor may also be deleted in editor block 384 and an I/O point may be deleted in editor block 385.

When all of the entries have been made, the user exits the graphic control loop editing mode by depressing the digitizer pen on the EXIT area 282 of the bit pad 250. The editor moves from entry block 374 to editor block 386 to verify that all of the algorithms have their inputs initialized and to perform other error checking routines. The user is then prompted to select an exit option in entry block 387, and the user can respond by requesting that the engineer's console 28 download the graphic control loop just created to the DPU specified in entry block 388. In this event, editor block 390 takes the CRT screen 132 image of the control loop and converts it to executable code and transmits it to the DPU for execution.

The buffer of information that has been generated during the process of building the graphic control loop is converted to executable code by storing blocks of information containing the addresses corresponding to the inputs and outputs of each of the algorithms within the graphic control loop. Each time an algorithm is called during execution of the process loop, the call includes an algorithm block of information containing the addresses of the input arguments, the addresses of the output arguments, and the address of the algorithm itself. This algorithm block is used by the functional processor in the DPU.

In addition to the conversion into executable code, additional information about the graphic control loop is stored in a data block containing graphic information used to reconstruct the diagram or rebuild the diagram on the CRT whether for modification of the loop, monitoring or documentation. In addition to the graphic information that contains the placement of algorithm boxes and interconnection lines, the names of the input points appearing at the top of the CRT screen and those output points appearing at the bottom of the CRT screen are also stored with this graphic information so that the graphic control loop can be redisplayed later.

EDIT LADDER CONTROL

The edit ladder mode is used to build, modify, and delete ladder diagrams on the CRT screen 132, each of which is ultimately downloaded to the DPU for execution so as to provide the sequential control functions for a controlled process. The user develops the ladder diagrams by selecting various ladder elements from the bit pad template 250 in an interactive fashion. When the user has selected the edit ladder mode during the control program development mode, the editor prompts the user to build a ladder diagram in accordance with specified rules of construction. Each of the ladder contact elements and coil elements has already been defined by the user in the data base edit mode as a collection of discrete digital points which can be referenced in the ladder.

The edit ladder mode also allows for inclusion of special function elements in the ladder diagrams such as an inverter, comparator, one-shot timer, on-delay timer, off-delay timer, and up/down counter. Each of the special function elements is a predetermined algorithm which is initiated in response to a change in state of one or more ladder contact elements acting as inputs, and which produces a digital output once the algorithm has been completed. For example, a comparator special function element will compare the values of two specified analog points when its input is true. The comparator produces three digital outputs with the state of each determined by the results of the comparison, thus providing one output for each case, whether the two analog values are equal or if one is greater or less than the other. Analog points which are used in the special function elements must be defined in the edit data base mode before the special function element is added to the ladder diagram.

Each ladder diagram containing one or more special function elements has a packed digital type point associated with it to support the monitoring of power flow at an operator's/alarm console in the DPF system. This allows the operator to determine the status of the digital output of a special function element, that is, whether or not the output of a special function element has changed state once the algorithm of the special function element has been completed. The packed digital point is automatically created for use in the system-wide data base and is available for broadcasting to the operator's/alarm console.

When using the edit ladder mode, the grid box location area 252 of the bit pad template 250 serves as the ladder building grid. The ladder element which is chosen to be placed in any given box is stored in a cell corresponding to that box location. A cell array is developed in this fashion and is stored in the engineer's console 28 memory. The algorithm input/output point locations and the algorithm boxes which were used in the graphic control loop editing mode are not used in the edit ladder mode.

The following conventions must be used when building or editing ladder diagrams:

A ladder network display on the CRT screen is 9 columns wide and can be up to 7 rows in height.

Contact elements and thru-branch elements can be placed in any of the first 8 columns.

Vertical connecting lines can be placed in any cell in rows 2 through 7 of columns 1 through 8.

Coil elements can be placed in column 9 only.

Special function elements can be placed in columns 2, 4, 6 or 8.

Figure 17:
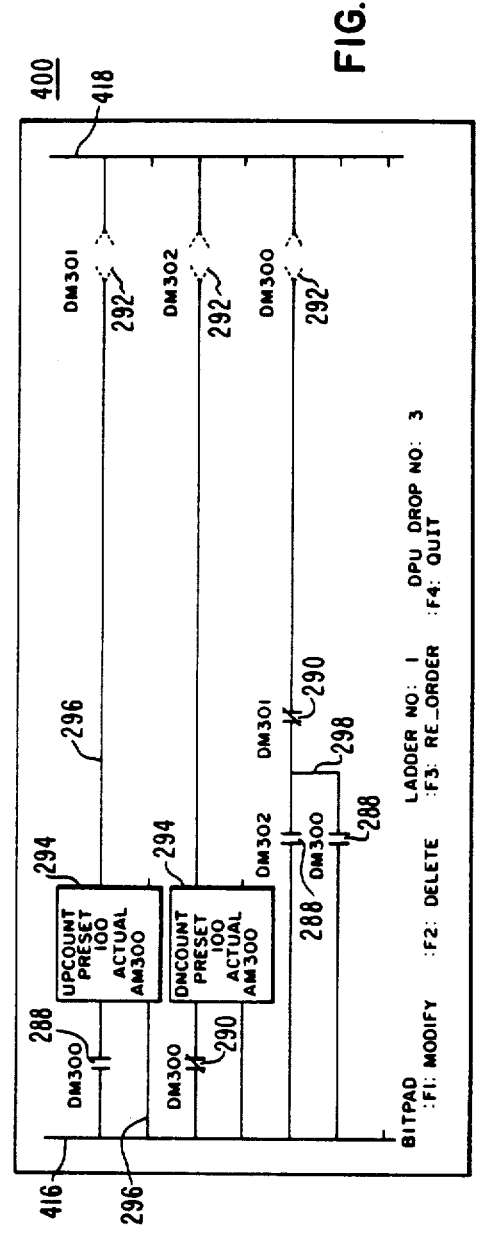
FIG. 17 shows a typical ladder logic diagram for a portion of a process control system.
Figure 16:
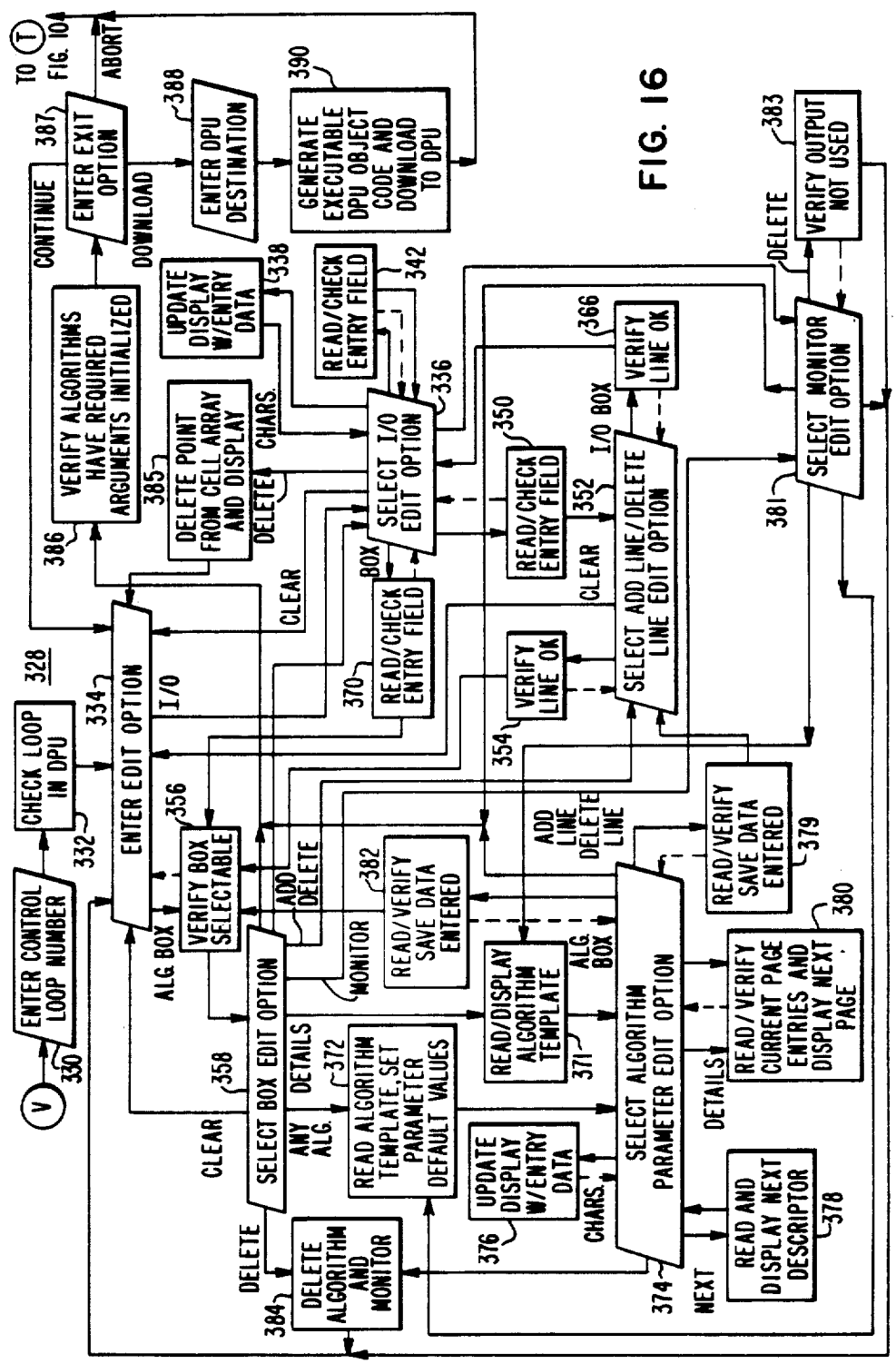
FIG. 16 shows a portion of a flowchart for a method programming a drop.
Figure 18:
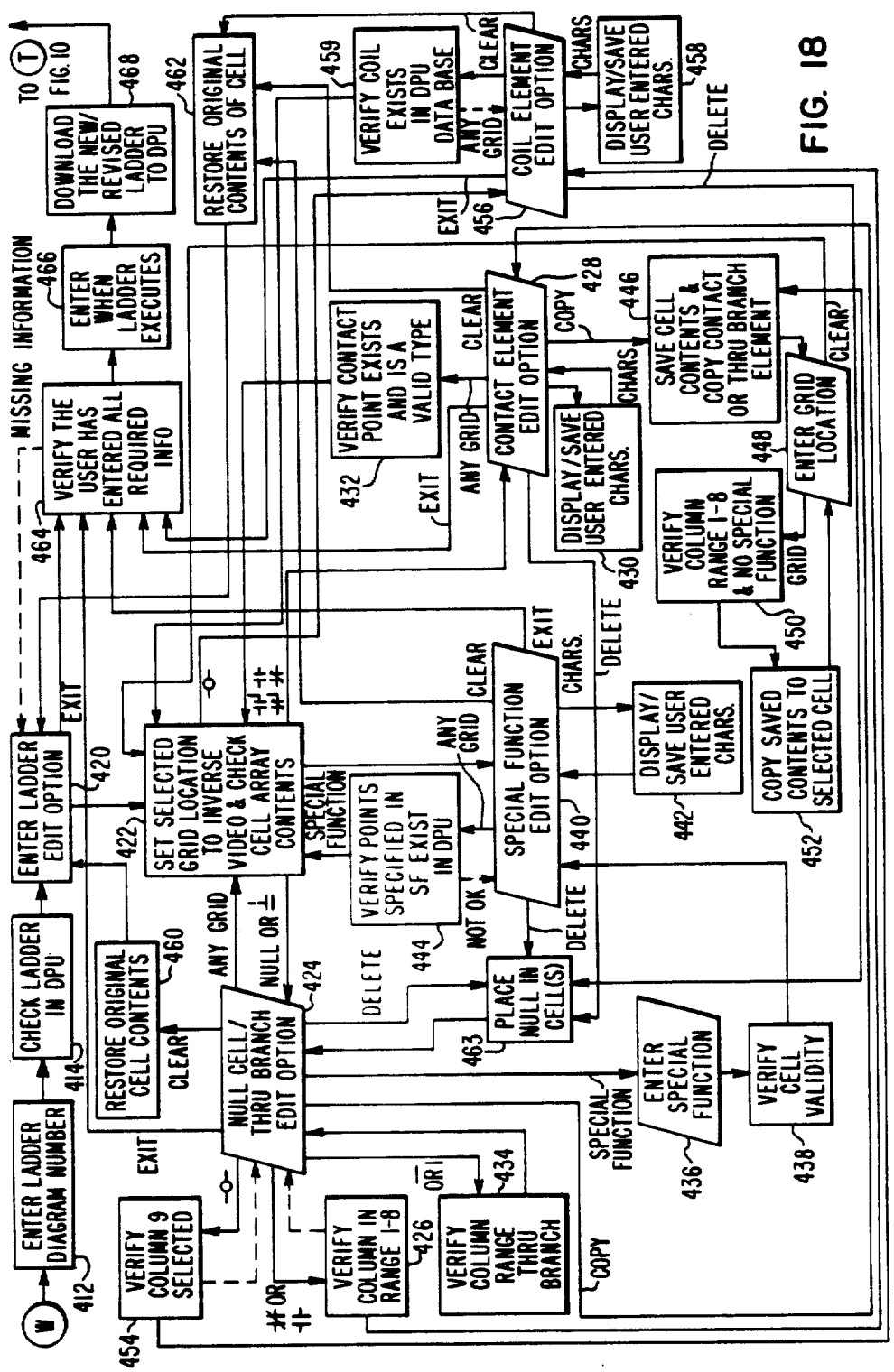

FIG. 17 shows the finished version of a sample ladder diagram 400 which may be built in the editor ladder mode on the CRT screen 132. The following is a description of the procedures used to develop this ladder diagram, with the procedures used by the editor shown in the flowchart 410 of FIG. 18.

The user begins the editing procedure at the engineer's console 28 by entering into the control program development mode as discussed earlier. When the editor prompts the user to select an editing mode, the user selects the edit ladder mode. At this point, entry block 412 prompts the user to enter a ladder diagram number to designate the ladder diagram being built. Editor block 414 then checks this ladder diagram number to determine if it is already in the DPU being programmed. If it does exist, the DPU sends back the information pertaining to that ladder diagram. If not, the editor initializes memory so that a new ladder diagram can be added under that ladder diagram number.

Once the editor initializes the memory buffer, it places the basic ladder diagram display up on the CRT screen 132. This display contains the left and right power legs 416 and 418 and indication markers for the columns and rows. The editor moves into entry block 420 which is the ladder edit option. The user then proceeds to build the sample ladder diagram 400 of FIG. 17 by positioning the cursor on the CRT screen 132 where a contact, coil or special function element is to be added. In this case, the user presses the digitizer pen against the bit pad 250 at grid location 1,1 (row, column) corresponding to the upper leftmost cell in the diagram 400. The editor moves to editor block 422 and turns the selected grid location to an inverse video contrast while also checking the contents of the cell array for the selected grid location. Because no ladder element has been previously chosen for this cell, the cell contains a null cell. The editor will therefore move to entry block 424 which is the null cell/thru-branch edit option. The user then presses the digitizer pen to the chosen ladder element symbol of the bit pad 250, which in this case is a normally open contact ladder element 288. The editor then goes to editor block 426 to verify that the chosen contact is in columns 1 through 8. The editor then moves to entry block 428, which is the contact element edit option. As the user types in the name of the digital point which contains the information about this contact ladder element, DM300 in this case, the editor moves between editor block 430 and entry block 428 to display the characters being entered.

When the user is finished typing the name of the contact, he then presses the next grid location desired in this column, in this case grid location 2,1. The editor responds by moving to editor block 432 to verify that the name of the contact just entered actually exists in the DPU data base and that it is a valid type. The editor then moves to editor block 422 to check the contents of the cell array for the newly selected grid location, and because it is a null cell, the editor moves to entry block 424, the null cell/thru-branch edit option. For this example, the user then selects the thru-branch ladder element 296 from the bit pad 250. The editor moves to editor block 434 to verify that the selections is within columns 1 through 8 and the thru-branch 296 is then entered into the cell array and the editor returns to entry block 424.

The user then selects the next grid location to be used for the special function by pressing grid location 1,2 on the bit pad 250. The editor then moves to editor block 422 to set the selected grid location to inverse video on the CRT screen 132, and then the editor moves back to entry block 424 because a null cell is currently in the cell array. The user then presses the special function ladder element 294 on the bit pad 250, and the editor moves to editor block 436. At this point, the CRT screen 132 displays the choice of special functions available and the corresponding function tab in the function tab area 266 of the bit pad template 250. The user depresses the appropriate tab for the UPCOUNT (up counter) special function. The editor then moves to editor block 438 to verify that a valid cell has been selected, meaning an even numbered column is being chosen for placement of a special function. The editor then proceeds on to entry block 440 which is the special function edit option. The user then types in, in the entry fields, the name of the analog point that will be used for this counter, and the editor moves between editor block 442 and entry block 440. In this example, the point name is AM300, and the preset value for the special function is then entered.

Once the user enters the parameters for the special function, the user then presses grid location 1,3 to proceed with connecting the special function output over to the coil ladder element. The editor moves from entry block 440 to editor block 444 to verify the points specified in the special function exist in the DPU data base. Assuming these are correct, the editor moves to editor block 422 and because a null cell is contained in the cell array for the last grid location selected, the editor moves to entry block 424. The user then presses a thru-branch ladder element 296 and the editor moves to editor block 426 to verify that this entry is in columns 1 through 8, after which the editor returns to entry block 424.

To complete the horizontal connection to the coil ladder element itself, the user can depress the REP/-COPY area 276 of the bit pad 250 and the editor moves to editor block 446 to save the contents of the current cell and copy the thru-branch ladder element 296 into the grid location specified by the user in entry block 448. In the example, the user would depress grid location 1,4 and the editor moves to editor block 450 to verify that the column range is appropriate and no special function is currently in that cell. If indeed that is the case, editor block 452 copies the saved contents into that cell and then proceeds on to entry block 448. The user can then continue to depress the remaining grid locations 1,5 through 1,8 each time causing the editor to move to editor blocks 450, 452 and back to 448 and that will complete the drawing the line across the CRT screen after which the editor will come to rest in entry block 448. The user then depresses the CLEAR area 278 on the bit pad 250, and the editor moves to editor block 422 and on to entry block 424 since a thru-branch ladder element 296 is contained in the cell corresponding to the last entry. The user then depresses the digitizer pen to the bit pad 250 to select the grid location corresponding to the coil ladder element 292, which is grid location 1,9. The editor moves to editor block 422 and from there back to entry block 424 since the cell array contains a null cell. The user then depresses the coil ladder element 292 on the bit pad 250 and the editor moves to editor block 454 to verify that column 9 has been selected, after which the editor moves to entry block 456 which is the coil element edit option. The user then types in the name of the coil ladder element DM301 in the example, and the editor moves between entry block 456 and editor block 458. The coil element edit option can also be obtained if an existing coil is to be modified, and such a selection in entry block 420 will move the editor to editor blocks 422, 456 and 459 to check the cell array and verify that the coil exists in the DPU data base before allowing modification.

The process described above is repeated for completion of the ladder diagram 400 for rows 3, 4, 5 and 6 in the example. In completing the ladder diagram, the CLEAR area 278 of the bit pad 250 can be used to store the original cell contents to any cell for which an edit option has been selected and this restoration will be performed by editor blocks 460 or 462. A deletion of the contents of any cell is performed by editor block 463 in response to user action involving the DELETE area 268 of the bit pad 250 in an edit option.

Once all of the remaining ladder rungs have been entered, the user depresses the EXIT area 282 on the bit pad 250. The editor then moves to editor block 464 and verifies that all the ladder elements on the CRT screen 132 have the required information, including the name of the process point which each ladder element represents. Once the editor verifies this, entry block 466 allows the user to select when the ladder is to execute in the application program of the DPU. This allows the user to choose whether the ladder diagram is executed as the first item in the application program, the last item or after any other ladder diagram, graphic control loop diagram, or text algorithm. This flexibility gives the user the ability to fully integrate the ladder diagram into the remainder of the system. Editor block 468 converts the information in the cell array of the ladder diagram into executable code for use by the DPU, and that code is then downloaded to the DPU for execution.

To convert the cell array to DPU executable code, the editor will first convert the contents of cell 1,1 and this is done by obtaining the address for the digital point or contact in cell 1,1 which is DM300 in the example. This address is inserted in the executable code and is used to represent the value of that contact to the SBL linesolver. The editor then converts the thru-branch ladder element in cell 2,1 to executable code so that the power flow from the column to the left of the thru-branch is maintained as the output from the thru-branch to the next column on the right. The editor then converts the remaining ladder elements in the first column to executable code in a similar fashion, and when the sixth cell has been converted, the editor marks that with an identifier indicating the end of a column has been reached.

The editor then proceeds to convert the special function in cell numbers 1,2 and 2,2 to a function block similar to an algorithm block which performs the special function. The address for the process point (AM300) used by the special function is obtained and included in the function block. The editor treats the second special function in cells 3,2 and 4,2 in a similar manner, and the editor completes the conversion for column 2 with the end of column identifier placed after cell 6,2 has been converted. A similar conversion occurs in columns 3 and 4, and the editor then adds coil ladder elements DM301, 302, and 300 in a manner similar to that used for the special functions. The addresses for the coil ladder elements are obtained from the DPU data base and incorporated into a function block used during DPU execution which writes the value of the power flow calculated by the SBL linesolver to the digital point representing the coil ladder element. At the end of the process of converting the cell array for the sample ladder diagram into DPU executable code, the editor downloads the information over the data highway to the DPU and inserts it into the application program which the user had previously designated. In addition, the graphic information for reconstructing the ladder diagram on the CRT is stored in a manner similar to that described earlier for the graphic control loop display.

SELF-DOCUMENTATION

The control loop and ladder diagram graphic information which is stored in data blocks is used to reconstruct these diagrams, giving the system of the invention a self-documenting capability and greatly simplifying user documentation procedures. The user has the option of obtaining a hard copy printout of the CRT screen 132 display for a single control loop or ladder diagram or a summary of all loops and ladders in the DPU. This is accomplished by printing the contents of the data blocks on the printer 134. In addition, a concordance is provided which illustrates the interconnection of all of the individual loop and ladder diagrams by summarizing and identifying the loop and ladder diagrams which use each of the process points in the DPU data base.

REORDER

Figure 19:
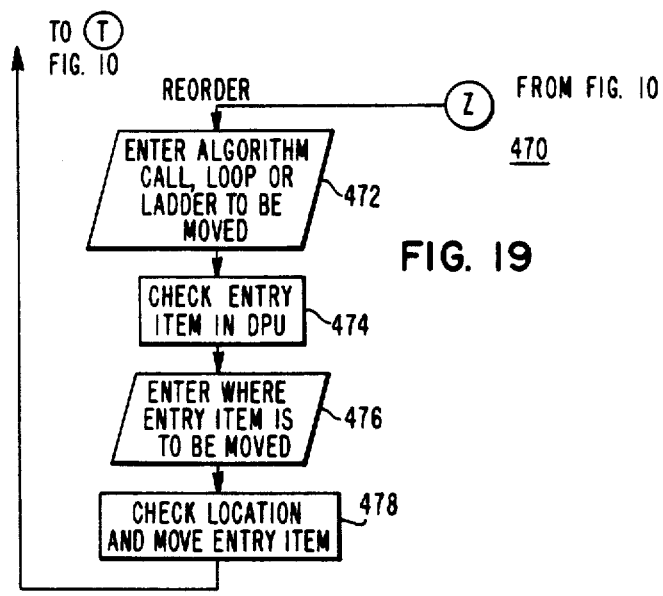
FIGS. 18 and 19 show a portion of a flowchart for a method of programming a drop.

The reorder editing mode is used to change the sequence of the text control algorithms, graphic control loops, and ladder diagrams which execute within the DPU's process control loop. The user selects the reorder mode in response to entry block 162 of FIG. 10. Flow chart 470 in FIG. 19 shows entry block 472 which then prompts the user to enter the algorithm loop or ladder which is to be moved in the DPU process control loop. Editor block 474 checks whether this item is actually in the DPU, and entry block 476 then requests the user to specify where the item is to be moved. The user may then designate that the item is to execute first, last or after a particular other item which is identified by its index in the DPU process control loop. Editor block 478 then checks the designated location and moves the entry item accordingly.

PROCESS LOOP EXECUTION

Figure 20:
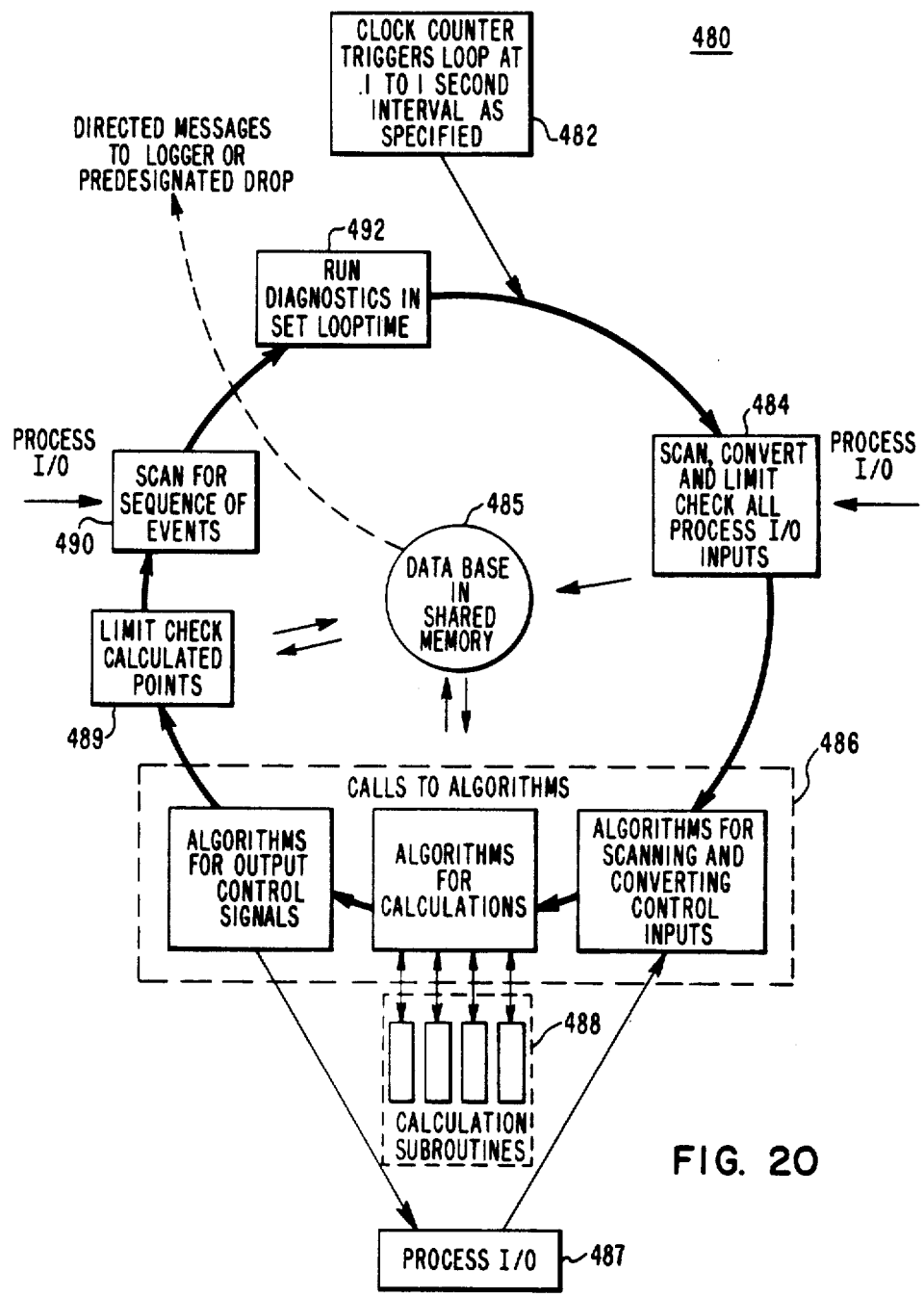
FIG. 20 shows a flowchart of the sequence of software execution in a drop.

The basic activities that can be performed by the process loop in each DPU are data acquisition and modulating and sequential control. In the phase diagram 480 of FIG. 20, the phases that includes scanning, conversion, and limit checking activities are data acquisition functions. Control functions are provided by the series of algorithms called during the DPU process loop execution. Referring now to FIG. 20, a trigger phase 482 is shown which enables a clock counter to trigger the DPU process loop execution at specified intervals. This ensures that all requisite operations are performed in the time specified for the DPU process loop. Loop time is predesignated individually for each DPU (in the application software), and this designation may range from one tenth to one second. In the read data phase 484, the initial action taken by the DPU is to scan the process inputs and collect the raw data that is available concerning the process operation. These process input signals are converted and limit checked with information from the DPU data base 485 that is stored in shared memory. The data base 485 is updated to reflect current process information. As the loop executes, all process inputs are scanned, converted, and limit checked once per second.

During the algorithm call phase 486, the DPU process loop initiates calls to the various algorithms as specified in the application program. These algorithms perform the scan, conversion, calculation, and control operations for the process area 487 that the DPU is to monitor and/or control. Algorithms are called at the frequency set for the DPU. The order of these calls is managed by the DPU support software as described earlier, however there is a general calling sequence. Algorithms that scan and convert control inputs are called initially. Then algorithms 488 that perform calculations are called. Ultimately, calls are made to algorithms that output control signals to the process application. The algorithms have nearly transparent access to the data base stored in shared memory. That is, regardless of where the data originates, the algorithms are able to utilize that data without regard to its origination point.

The limit checking phase 489 of the process loop analyzes all of the calculated results once per second to ensure that they are within set limits.

In the sequence of events phase 490 of the process loop, the process inputs are scanned for the presence of sequence of events (SOE) information. This kind of information indicates that certain events have occurred in the operation of the plant process, and this information is time-tagged data which is collected for storage in shared memory for subsequent transmittal over the data highway. At the appropriate time in the data highway communication sequence, the SOE information is sent as a directed message over the data highway to a predesignated drop, for example a logger drop.

In the diagnostic phase 492 of the DPU process loop, the time remaining before repetition of the DPU process loop is devoted to diagnostic testing which ensures that all subsystems continue to function at their optimum capability. These diagnostics are performed as specified by the DPU support systems.

At the designated loop time, the sequence of operations is repeated. This continuous execution of the DPU process loop enables the DPU to provide reliable monitoring and control functions for the process control system application.

The support software of the DPU also contains provisions for modification of the DPU process loop by accepting changes entered at the engineer's console drop 28 and downloaded via the data highway 70 to the affected DPU drop. These modifications include:

Entered Values—These values are entered by the operator and stored by the DPU as if they had been read from the process input. The DPU stops the normal scanning of the designated input so that the manually entered value is preserved and utilized in the execution software.

Tuned Constants—Certain control algorithm constants can tuned by the operator. These new values are accepted by the proper DPU, stored in the data base, and used in the subsequent operation of the control algorithms.

Scan Adjustment—This feature allows various process inputs to either be included or excluded from scanning by the DPU during the read data phase of the DPU process loop.

Limit Checking Adjustment—Limit checking is the comparison of a current input point's value to the incremental and the high and low limits assigned to that point. A point may be limit-checked or not limit-checked depending on the status (ON/OFF) assigned to that point. The DPU continues to check whether a sensor's limits have been exceeded regardless of whether the limit checking feature is on or off.

Alarm Checking Adjustment—Alarm checking causes a point to be included (ON) or excluded (OFF) from all comparison with limits assigned to that point including sensor limits, high and low limits and incremental limits. If the status of alarm checking is off, sensor limits are not checked.

Change Limits—Values assigned to a point for purposes of limit checking may be changed. This includes high and low limits, incremental limits, and the values assigned for the deadband.

What is claimed is:

1. Method of developing a process control loop program for execution in a digital processing unit (DPU) to control a process, said method comprising the steps of:
 (a) storing a graphics program representation of a predetermined graphical grid pattern of an unconfigured process control loop in a memory, said grid pattern having a predetermined number of input and output process control loop entries with predefined locations therein;
 (b) causing said graphics program to be executed by a controller to display said grid pattern on a visual display device;

(c) selecting at least one algorithm for said process control loop program from a library of algorithms stored in a memory;

(d) causing a predefined outlined region to appear in the displayed grid pattern at a specified location for each selected algorithm;

(e) setting parameters associated with each selected algorithm;

(f) selecting at least one input entry from said predetermined number thereof for said process control loop program and assigning a predefined input variable of said process control loop to each selected input entry;

(g) causing each said input entry selection and corresponding assignment to appear in the displayed grid pattern at its predefined location;

(h) selecting at least one output entry from said predetermined number thereof for said process control loop program and assigning a predefined output variable of said process control loop to each selected output entry;

(i) causing each said output entry selection and corresponding assignement to appear in the displayed grid pattern at its predefined location;

(j) causing graphical line interconnections to be drawn in the displayed grid pattern between the selected algorithm region locations and the selected input and output entries to configure a block diagram schematic of the desired process control loop;

(k) storing in memory information of said process control loop generated during the graphical configuration thereof in accordance with the above steps (c) through (j); and (l) converting the stored information of the configured process control loop into instructional program code for execution in said DPU, whereby as the graphical display of the process control loop is completed on the visual display device, the process control loop program may be concomitantly completed for use by said DPU.

2. The method in accordance with claim 1 including the step of developing a process control loop program for each of a plurality of digital processing units for execution therein to control corresponding aspects of the process, said step comprising:

indexing each process control loop program to be developed and assigning it to its corresponding DPU;

performing steps (b) through (l) for the development of each indexed process control loop program; and downloading each developed process control loop program to its assigned DPU for execution therein to control its corresponding aspect of the process.

3. The method in accordance with claim 2 including the steps of:

developing a plurality of control loop programs for execution in a common DPU; and sequencing the order in which said plurality of control loop programs are executed in said common DPU.

4. The method in accordance with claim 3 including the step of re-ordering the executing sequence of the plurality of control loop programs in the common DPU.

5. The method in accordance with claim 1 including the step of displaying the configured block diagram schematic of the process control loop on the visual display device during the execution of the corresponding process control loop program in the DPU to trend the values of the assigned input and output variables in real time.

6. The method in accordance with claim 5 including the step of suspending the execution of the process control loop program in the DPU to modify a parameter associated with a selected algorithm of the process control loop program through interaction with the visual display device while the process control loop graphics are being displayed.

7. The method in accordance with claim 1 wherein step (j) includes the steps of:

storing in a look-up table in a memory a set of graphic design rules for allowable interconnections between the selected algorithm region locations and the selected input and output entry locations;

determining the validity of each graphical line caused to be drawn by comparing each graphical line with the set of allowable interconnections stored in said memory look-up table; and rejecting each graphical line found to be invalid as a result of said comparison.

8. The method in accordance with claim 1 including the step of printing a graphical representation of the configured process control loop in accordance with the stored information of step (k) for hard copy self-documentation thereof.

* * * * *